United States Patent
Demidov et al.

(10) Patent No.: US 12,086,647 B2
(45) Date of Patent: Sep. 10, 2024

(54) DYNAMIC SUBTASK CREATION AND EXECUTION IN PROCESSING PLATFORMS

(71) Applicant: ABBYY Development Inc., Dover, DE (US)

(72) Inventors: Vladimir Demidov, Moscow (RU); Vladimir Bukin, Moscow (RU); Vladimir Yunev, Krasnogorsk (RU); Alexander Subbotin, Zhukovsky (RU)

(73) Assignee: ABBYY Development Inc., Dover, DE (US)

( * ) Notice: Subject to any disclaimer, the term of this patent is extended or adjusted under 35 U.S.C. 154(b) by 89 days.

(21) Appl. No.: 18/083,127

(22) Filed: Dec. 16, 2022

(65) Prior Publication Data

US 2024/0202043 A1 Jun. 20, 2024

(51) Int. Cl.
*G06F 9/48* (2006.01)
*G06F 9/50* (2006.01)

(52) U.S. Cl.
CPC .............. *G06F 9/5061* (2013.01); *G06F 9/48* (2013.01); *G06F 9/4806* (2013.01)

(58) Field of Classification Search
CPC ......... G06F 9/5061; G06F 9/48; G06F 9/4806
See application file for complete search history.

(56) References Cited

U.S. PATENT DOCUMENTS

| | | | |
|---|---|---|---|
| 6,304,866 B1 * | 10/2001 | Chow | G06F 9/505 |
| 8,250,576 B2 | 8/2012 | Yildiz et al. | |
| 9,323,672 B2 * | 4/2016 | Kim | G06F 12/0815 |
| 10,055,698 B2 * | 8/2018 | Elenbaas | G06Q 10/06 |
| 2023/0108560 A1 * | 4/2023 | Wang | G06F 16/9024 717/109 |
| 2023/0153147 A1 * | 5/2023 | Al-Maamari | H04L 63/0272 718/102 |

FOREIGN PATENT DOCUMENTS

| | | |
|---|---|---|
| CN | 1845075 A | 10/2006 |
| CN | 107463595 A | 12/2017 |

(Continued)

OTHER PUBLICATIONS

Qamhieh, et al., "Global EDF scheduling of directed acyclic graphs on multiprocessor systems," Proceedings of the 21st International conference on Real-Time Networks and Systems, Oct. 2013, Sophia Antipolis, France, pp. 287-297, 10.1145/2516821.2516836, hal-00878667.

(Continued)

*Primary Examiner* — Corey S Faherty
(74) *Attorney, Agent, or Firm* — Lowenstein Sandler LLP

(57) ABSTRACT

A method for dynamically generating and executing tasks can include includes executing a worker execution stream, where the worker execution stream includes multiple execution threads associated with a workflow of the workflow service, receiving, by the worker execution stream, from a workflow service, a definition of a task, and responsive to determining that the definition of the task satisfies a predefined criterion, dividing the task into a set of sub-tasks. The method further includes generating a definition of a sub-task workflow for the set of sub-tasks, and causing the workflow service to distribute, based on the definition of the sub-task workflow, the sub-tasks of the set to one or more workers for execution.

20 Claims, 14 Drawing Sheets

(56) References Cited

FOREIGN PATENT DOCUMENTS

| CN | 108958920 A | 12/2018 |
| CN | 112751856 A | 5/2021 |
| WO | 2019/085601 A1 | 9/2019 |
| WO | 2020/052241 A1 | 3/2020 |

OTHER PUBLICATIONS

Qamhieh and Midonnet, "Schedulability Analysis for Directed Acyclic Graphs on Multiprocessor Systems at a Subtask Level," University of Paris-Est-LIGM, France, Jun. 26, 2014, 29 pages.
Warneke and Kao, "Exploiting Dynamic Resource Allocation for Efficient Parallel Data Processing in the Cloud," IEEE Transactions On Parallel and Distributed Systems, Jan. 2011, 14 pages.

* cited by examiner

DYNAMIC SUBTASK CREATION AND EXECUTION IN PROCESSING PLATFORMS

TECHNICAL FIELD

The implementations of the disclosure relate generally to computer systems and, more specifically, to distributed processing and workflow management systems.

BACKGROUND

A distributed processing platform may be a programming framework allowing the creation, execution and maintenance of the flows of processes referred to as workflows. For example, it can facilitate communication between disparate data and process sources distributed across one or more applications and services. It can also provide process interaction between the disparate elements distributed across remote locations and can automate linking processes and their respective activities within a particular information technology environment. A distributed processing platform can also facilitate the integration of the processes occurring at the different application layers, intersystem and intrasystem communication, as well as process data routing, data transformation, and merging.

In some cases, a distributed processing platform configures, controls, and manages software processes across a distributed network (e.g., a cloud) of resources. The distributed processing platform can deploy portions of software code on the resources of the network to operate independently or in conjunction with each other to achieve a predetermined goal.

SUMMARY OF THE DISCLOSURE

Implementations of the present disclosure describe mechanisms and methods for dynamically generating and executing tasks in a distributed processing platform.

A system of the disclosure includes a memory, and a processor coupled to the memory, where the processor communicatively coupled to the memory to perform operations including executing a worker execution stream, where the worker execution stream includes multiple execution threads associated with a workflow of the workflow service, receiving, by the worker execution stream, from a workflow service, a definition of a task, and responsive to determining that the definition of the task satisfies a predefined criterion, dividing the task into a set of sub-tasks. The processor can also perform the operations including generating a definition of a sub-task workflow for the set of sub-tasks, and causing the workflow service to distribute, based on the definition of the sub-task workflow, the sub-tasks of the set to one or more workers for execution. The processor can also perform the operations of determining, by the worker execution stream, whether the definition of the task satisfies the predefined criterion, and responsive to determining that the definition of the task does not satisfy the predefined criterion, executing the task by the worker execution stream. Determining whether the definition of the task satisfies the predefined criterion can be performed based on at least one item selected from: values of one or more parameters of the task, resources available to the worker execution stream, and resources available to one or more other worker execution streams. The processor can also perform the operation of receiving, by the worker execution stream, from the workflow service, one or more parameters for executing the task. In the system, generating the definition of a sub-task workflow can include generating a sub-task graph defining the sub-task workflow in a text-based file format, and the worker execution stream can be provided by one of: a virtual machine, an execution container, a processing thread, or a process.

A method of the disclosure includes executing a worker execution stream, where the worker execution stream includes multiple execution threads associated with a workflow of the workflow service, receiving, by the worker execution stream, from a workflow service, a definition of a task, and responsive to determining that the definition of the task satisfies a predefined criterion, dividing the task into a set of sub-tasks. The method further includes generating a definition of a sub-task workflow for the set of sub-tasks, and causing the workflow service to distribute, based on the definition of the sub-task workflow, the sub-tasks of the set to one or more workers for execution. The method can also include determining, by the worker execution stream, whether the definition of the task satisfies the predefined criterion, and responsive to determining that the definition of the task does not satisfy the predefined criterion, executing the task by the worker execution stream. Determining whether the definition of the task satisfies the predefined criterion can be performed based on at least one item selected from: values of one or more parameters of the task, resources available to the worker execution stream, and resources available to one or more other worker execution streams. The method can also include receiving, by the worker execution stream, from the workflow service, one or more parameters for executing the task. In the method, generating the definition of a sub-task workflow can include generating a sub-task graph defining the sub-task workflow in a text-based file format, and the worker execution stream can be provided by one of: a virtual machine, an execution container, a processing thread, or a process.

A non-transitory machine-readable storage medium of the disclosure includes instructions that, when executed by a processing device, cause the processing device to perform operations including executing a worker execution stream, where the worker execution stream includes multiple execution threads associated with a workflow of the workflow service, receiving, by the worker execution stream, from a workflow service, a definition of a task, and responsive to determining that the definition of the task satisfies a predefined criterion, dividing the task into a set of sub-tasks. The instructions can cause the processing device to perform the operations further including generating a definition of a sub-task workflow for the set of sub-tasks, and causing the workflow service to distribute, based on the definition of the sub-task workflow, the sub-tasks of the set to one or more workers for execution. The instructions can also cause the processing device to perform the operations including determining, by the worker execution stream, whether the definition of the task satisfies the predefined criterion, and responsive to determining that the definition of the task does not satisfy the predefined criterion, executing the task by the worker execution stream. In the instructions of the non-transitory machine-readable storage medium, determining whether the definition of the task satisfies the predefined criterion can be performed based on at least one item selected from: values of one or more parameters of the task, resources available to the worker execution stream, and resources available to one or more other worker execution streams. The instructions can also cause the processing device to perform the operations of receiving, by the worker execution stream, from the workflow service, one or more parameters for executing the task. In the instructions of the non-transitory machine-readable storage medium, generating the definition of a sub-task workflow can include generating a sub-task graph defining the sub-task workflow in a text-based file format, and the worker execution stream can be provided by one of: a virtual machine, an execution container, a processing thread, or a process.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
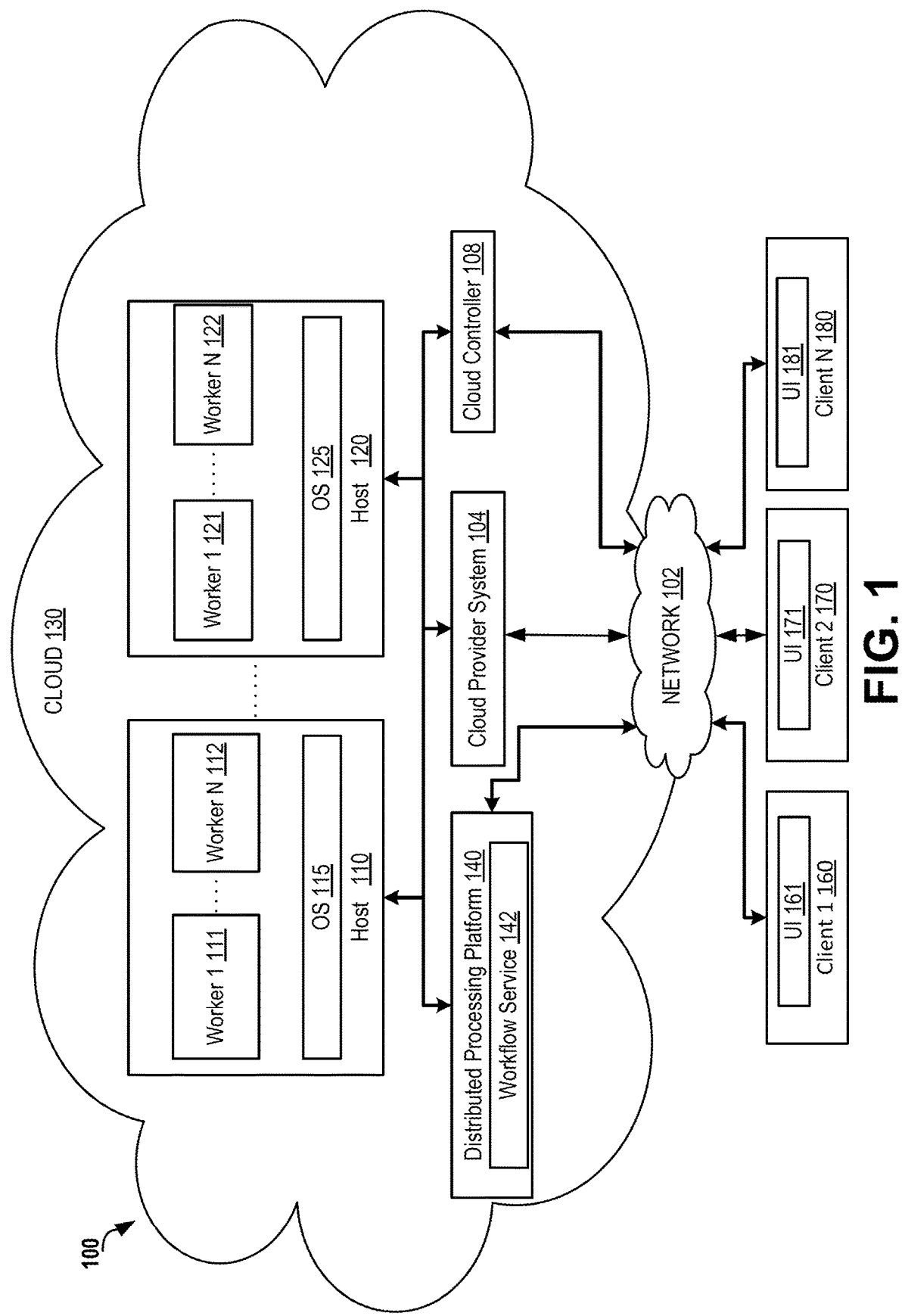
FIG. 1 depicts a block diagram of an example network architecture, in accordance with one or more implementations of the disclosure.

Implementations for dynamically generating and executing tasks in a distributed processing platform are described. More specifically, implementations disclosed herein relate to dynamically creating, modifying, and executing tasks and sub-tasks in workflows of distributed processing platforms.

Some approaches for performing processes with multiple constituent tasks include the use of distributed processing platforms. In some cases, a distributed processing platform configures, controls, and manages software processes across a distributed network (e.g., a cloud) of resources. The distributed processing platform can include a variety of workflow management and orchestration functions allowing it to manage (e.g., through a workflow service) the workflow of multiple jobs and constituent tasks assigned to respective computing resources within a computing network. The distributed processing platform can deploy portions of software code on the resources of the network to operate independently or in conjunction with each other to achieve a particular goal or objective which can refer to the overall purpose of the jobs or tasks in the workflow. Accordingly, a distributed processing platform can refer to a set of services designed to perform incoming tasks.

The tasks managed by the distributed processing platforms can be assigned to and executed by workers. The term "worker", as used in this disclosure, can refer to an execution stream (i.e., a worker execution stream) comprising one or more threads of execution (e.g., implemented as one or more programs) for performing certain actions within a workflow on input or data received from the distributed processing platform (e.g., another worker). A worker can execute one or more portions of a workflow and produce an output as a result of the execution.

In some implementations, a worker (i.e., a worker execution stream) can be a container within the distributed processing platform. A container can be an execution environment represented by an isolated virtualized user-space instance of an operating system. The containers can be employed to store the software application code, services, and micro-services (e.g., a utility program such as a compiler) for performing operations on the software code. A micro-service can be an independently-deployable modular service that can communicate with other services in a system (e.g., a cloud-based system) through a lightweight interface. The code of the software application may be stored along with micro-services in containers to create containerized applications. Each of the computing units (e.g., a host computer, a virtual machine, etc.) on a network may support a container execution environment. Each of the application services, processes, and sub-components may be hosted by one or more containers. Each of the containers and the resources used to execute the components of the application and their respective sub-components can be located at disparate physical locations (i.e., deployed in a distributed fashion across a distributed network of computing resources).

In some implementations, a complex process can be executed by a plurality of workers (e.g., execution streams, containers) running on the computing resources managed by the distributed processing platform. Such a process can be modeled by a graph of the workflow of the constituent steps of the process managed by a workflow process of the distributed processing platform. A workflow may be a representation of an end-to-end sequence of activities or tasks within a process. Execution of a process model may involve executing its constituent tasks in the order described by the workflow (e.g. sequentially or in parallel, depending on the graph of the workflow). Accordingly, a workflow can refer to an ordered, defined set of tasks, with relationships defined among those tasks, that achieves a desired end result. A workflow can include one or more processes each of which itself can be defined by iteratively more basic constituent elements (e.g., a workflow process can be defined by a job, that includes one or more tasks, each of which can include one or more sub-tasks, with an arbitrary further number of potential sub-divisions). For the purposes of this disclosure, the constituent elements of a process or a workflow (e.g., jobs, tasks, sub-tasks, etc.) are referred to as tasks. Where it is useful, constituent tasks of a task (e.g., a parent task or root task) can be referred to as sub-tasks to indicate the subordination of the sub-task to the task. A workflow can include actions of different types that can be performed simultaneously or in sequence, and the performance or order of the actions can depend on a condition (e.g., the result of the previous action). As noted above, a workflow can be described by a graph such as a directed acyclic graph (DAG) which represents the tasks executed by processing elements as nodes in the graph connected by edges representing transitions from one node of the graph to the other.

Therefore, a workflow describing a process can include multiple levels of tasks where a task refers to a constituent executable element within the workflow (e.g., as represented within a DAG) that can be executed by one or more workers (i.e., a worker execution streams) of the distributed processing platform. A task can, in some cases, be divided into one or more sub-tasks (i.e., tasks that are subordinate to another task), each of which can also be executed by one or more workers of the distributed processing platform. In some implementations, data can be received by a worker from the source connected to it by input edges in the DAG, and the result can be transmitted from the worker as output at the outgoing edges in the DAG. Accordingly, in some cases, the tasks themselves can be represented by sub-task graphs (i.e. sub-task DAGs) that include a combination of sub-tasks defined in a DAG.

In some systems, a variety of approaches for representing complex processes on distributed processing platforms (DPPs) can be implemented in the form of DAGs. For example, DPPs can rely on pre-determined workflows represented by static DAGs that determine the flows and sequences of tasks performed within the workflow. However, not all such representations are suitable for all scenarios. Due to the limitations of the syntax, constructs, and data structures used to define DAGs statically, they become insufficient to define complex flows where an execution of subsequent tasks depends on the result/output of one or more preceding tasks in the flow.

For example, in some scenarios, a task that corresponds to a DAG's downstream node may be defined dynamically from the result of one or more preceding (e.g., current) task corresponding to one of the upstream nodes, and can depend on factors that are cumbersome to define statically. Because the static workflow definition syntax is limited to a few control constructs, it does not adequately describe complex scenarios with dynamically interrelated tasks. Further, in some implementations, various possible workflows may need to be explicitly defined along with all of their constituent tasks and sub-tasks. In such cases, multiple (versions of) DAGs may be created to account for the variety of possibilities of the outputs/results of the upstream preceding task(s) that each affect the downstream subsequent tasks in the flow (i.e., to account for situations where a downstream task dynamically depends on an upstream task's result/output). The creation of additional DAGs creates a strain on resources which is further exacerbated by delayed speed of execution of the process flow. Furthermore, because the execution of the tasks can, in some implementations, be controlled by an application that includes functionality redundant for the execution of the dynamic steps, these approaches often increase cost of switching between steps when different instruction sets for each alternative version of a DAG need to be preloaded (to be ready for execution if a particular output from a preceding task is obtained).

Aspects and implementations of the instant disclosure address the above noted and other deficiencies, by providing dynamic workflow description and execution mechanisms that are more suitable for scenarios in which the worker decides on the number and type of subsequent tasks or sub-tasks during the execution of the task assigned to it. The implementations described herein are designed to address the abovementioned challenges and to create a fundamentally new solution for performing complex processes on DPPs. The various implementations include methods and systems for performing complex process workflows represented in the form of DAGs, through the generation and execution of dynamically creatable sub-tasks (and sub-task DAGs) in the DPP. This is achieved by having the worker (i.e., a worker assigned a particular task) itself independently creates sub-tasks that are not described in the static workflow definition so that they can be separately executed by one or more workers. Moreover, the topologies of the sets of sub-tasks generated by the worker is not limited to a flat list of sub-task topologies, and the worker can, therefore, generate independent branches of sub-task executions in more complex workflows. The worker can decide whether to execute a task or to divide it into a set of sub-task to be executed by other workers based on a variety of factors including the parameters of the task, the state of the worker, and the state of other workers in the DPP.

The complex workflows representable as DAGs can include, as an illustrative example, data recognition on a multi-page document where a worker receives the task of recognizing a document consisting of, for example, 100 (or more) pages. If the goal required the processing of only one page, a worker could analyze it, recognize it, output the recognized text and finish the work. However, in this scenario where there are many pages, the worker can divide the document into separate pages, put each of the pages in temporary storage, generate 100 sub-tasks to respectively recognize each of the single-page documents, generate an additional sub-task to join the results of the 100 sub-tasks, and can then send these generated sub-tasks as its output to the workflow service of the DPP. The transmission of the resulting generated set of can conclude that stage of the worker's operation. In this scenario, the sub-tasks received from the worker, after validation, can be distributed among the workers through the workflow service in the DPP. Accordingly, available workers who have the ability to perform recognition function on the document (i.e., including the worker that generated the sub-tasks, which should now be unoccupied), can receive the one-page documents, analyze them, recognize them and output the recognized text as a result. Further, the sub-task of joining the results of the recognition sub-tasks can be performed by another worker or by the original one that generated the set of sub-tasks.

Therefore, the implementations described herein permit the dynamic creation of sub-tasks by workers and reduce the computing resources that may be used for generating and storing a large number of statically defined workflows attempting to cover various possible workflow scenarios. Accordingly, the various implementations enable workers to dynamically create their own sub-task DAGs (i.e., a task can be transformed into a set of sub-tasks represented by a DAG), which can then be processed as a yet another workflow that can account for the subordinate nature of the newly created sub-task DAG to the original DAG. More specifically, upon receiving a command to perform a task as part of a workflow, a worker can decide to either execute the task or to divide the task into a set of sub-tasks and generate a new DAG. The worker can make that determination based on the predetermined parameters of the worker, the input data, and/or other conditions (e.g., initial state of the worker, current state of the worker, current global state of all workers). In this manner, resources can be conserved as there is no need to create and maintain multiple versions of workflow DAGs. Further, the ability of workers to dynamically determine whether to execute a task or create a DAG of sub-tasks of the task in accordance with the state of the workers that can execute those sub-tasks and the types of tasks that form part of the workflow, allows distributed processing platform/system to utilize computing resources more efficiently and to complete workflows more rapidly. This enables both the conservation of computing resources and an increase in the speed of execution complex workflows. Further explanations of the implementations are described with reference to FIGS. 1-14 and include details of the methods and systems for dynamically generating and executing tasks in a distributed processing platform.

FIG. 1 is a block diagram of a network architecture 100 in which implementations of the disclosure may operate. In some implementations, the network architecture 100 may be used in an enterprise process management systems using a container orchestration platform, such as Kubernetes®. The enterprise process management system can provide resources and services (e.g., micro-services) for the development and execution of applications owned or managed by multiple users using enterprise automation frameworks. An enterprise process management system can provide a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-user and multi-tenant systems.

As shown in FIG. 1, the distributed computing system 100 may include a cloud-computing environment 130 (also referred to herein as a cloud) that includes workers 111, 112, 121, 122 to execute workflows (e.g., processes, tasks, sub-tasks etc.) associated with the workflows. A worker providing computing functionality may provide the execution environment for a task of a workflow of the distributed processing platform (DPP) 140. In some implementations, the worker may refer to a container or virtual machine (VM) that is hosted on a physical machine, such as host 1 110 through host N 120, implemented as part of the cloud 130. In some implementations, the host machines 110, 120 can be located in a data center. For example, both workers 111 and 112 can be hosted on the same physical machine 110 in cloud 130 provided by cloud provider 104. In other implementations, different tasks of the same workflow can be assigned to worker N 112 and worker 1 121 with each worker being hosted on different physical machines 110 and 120 and respectively located in disparate geographic locations and within different local networks. In some implementations, an environment other than a container or VM may be used to execute functionality of the enterprise process management system applications. When workers 111, 112, 121, 122 are implemented as containers or VMs, they may each be executed by respective operating systems (OSs) 115, 125 on each respective host machine 110, 120.

In some implementations, the host machines 110, 120 may be located in the same data center while in other implementations, the host machines 110, 120 can be located in different data centers in remote physical locations from each other. Users can interact with applications and services executing on the cloud-based workers 111, 112, 121, 122 using client computer systems, such as clients 160, 170 and 180, via corresponding user interfaces (e.g., web browser applications) 161, 171 and 181.

Clients 160, 170, and 180 can be connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer, or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications, workflows, programs, and services in the cloud 130. In some implementations, cloud controller 108 receives commands from the DPP's 140 workflow service 142. In response to these commands, the cloud controller 108 can provide data associated with different tasks to the cloud provider system 104 and DPP 140.

Figure 15:
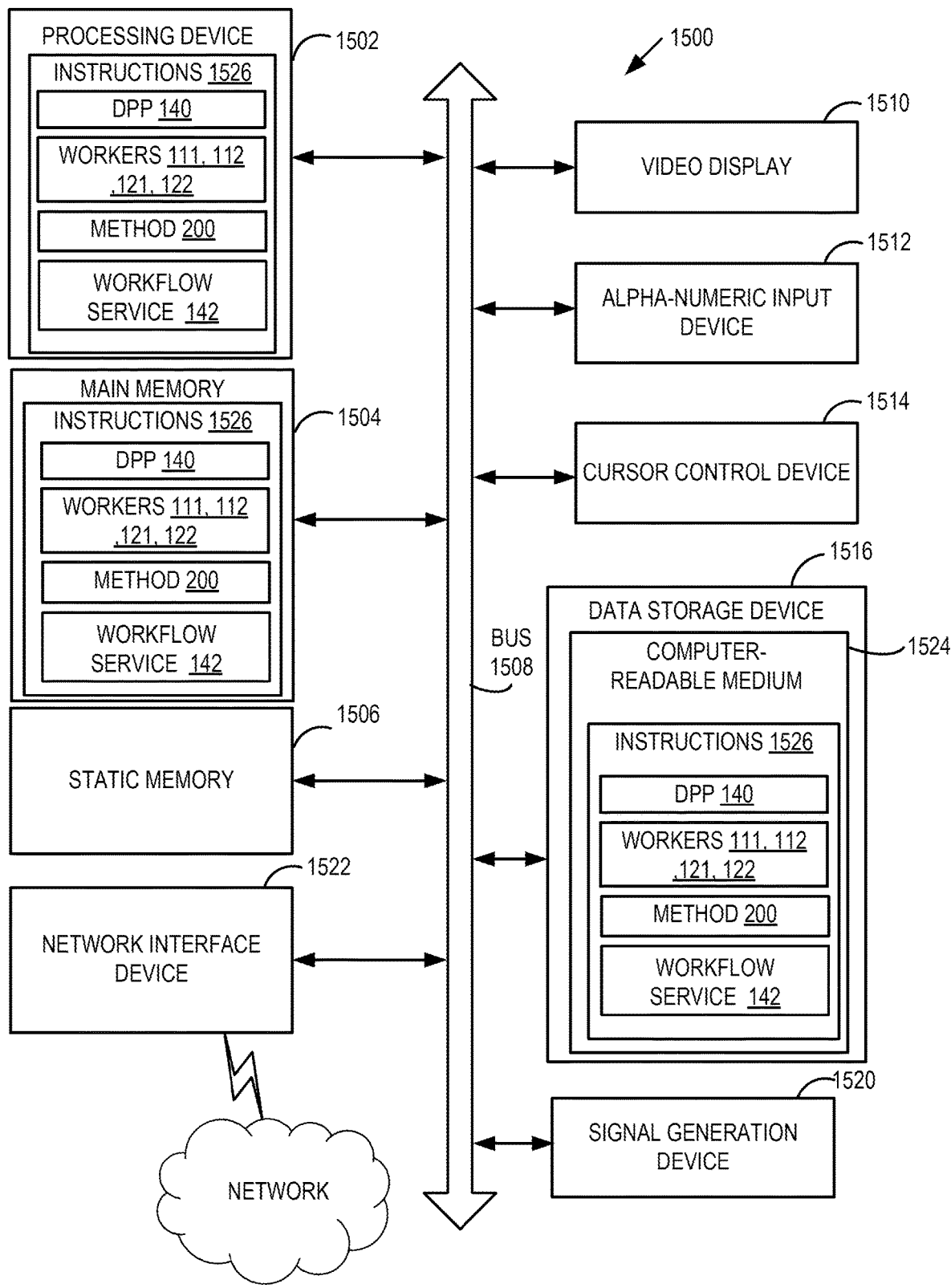
FIG. 15 depicts a block diagram of an example computer system in accordance with some implementations of the present disclosure.

DPP 140 may provide management and orchestration functions for managing applications and/or services as well as executing workflows and assigning tasks in system 100. For example, DPP 140 can execute one or more workers implemented as a container for providing functionality of processing and executing tasks of a workflow. DPP 140 can include one or more computing devices (e.g., a computing device as shown in FIG. 15). DPP 140 can implement an application programming interface to facilitate deployment, scaling, and management of containerized applications and the execution of workflows and constituent tasks.

Each of the workers 111, 112, 121, 122 can execute one or more tasks of a workflow. Each of the tasks can correspond to a discrete step in a workflow and can, in some cases, be divided into constituent sub-tasks, of a workflow in the DPP 140. Each of the workers 111, 112, 121, 122 can run as an execution stream comprising one or more threads of execution in a suitable machine (e.g., a container, a virtual machine, a physical machine, etc.). A worker 111, 112, 121, 122 running in system 100 may communicate with one or more other workers 111, 112, 121, 122 in system 100. Additional details of the operations of the DPP 140 and the workers 111, 112, 121, 122 of architecture 100 are provided below with further reference to FIG. 2.

Figure 2:
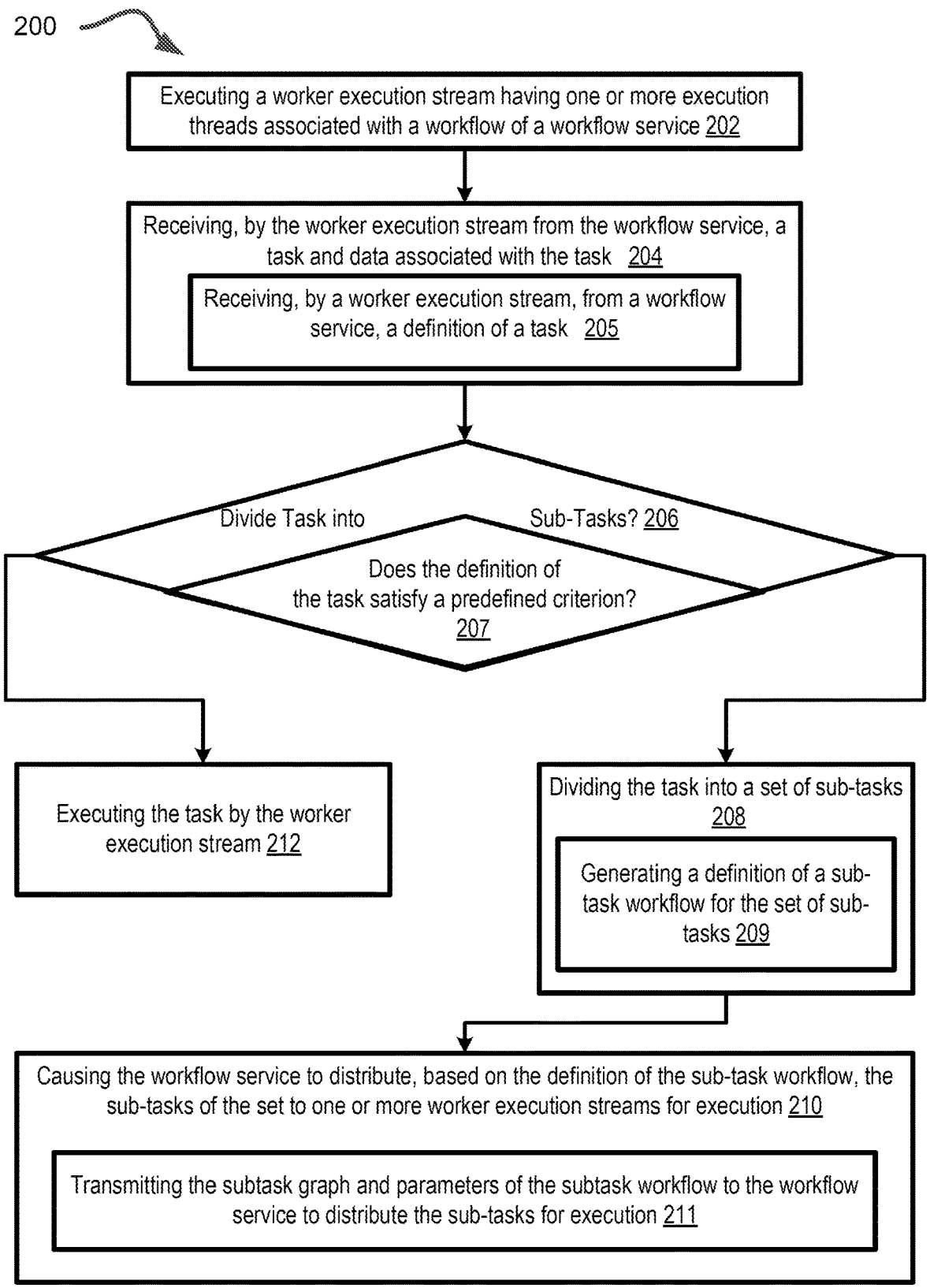
FIG. 2 depicts a flow diagram of an example method for generating and executing tasks in a distributed processing platform in accordance with some implementations of the present disclosure.

FIG. 2 depicts a flow diagram of an example method 200 for generating and executing tasks in a distributed processing platform in accordance with some implementations of this disclosure. Method 200 may be performed by processing logic that may comprise hardware (e.g., circuitry, dedicated logic, programmable logic, microcode, etc.), software (such as instructions run on a processing device), firmware, or a combination thereof. In one implementation, method 200 may be performed by a processing device (e.g. a processing device 1502 of FIG. 15) of a computing device 110 and/or architecture 100 as described in connection with FIG. 1. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated descriptions list the operations of method 200 in certain order, various implementations of the methods may perform at least some of the described operations in parallel and/or in arbitrary selected orders.

Accordingly, in some implementations, a distributed processing platform 140, can execute a worker execution stream 111, 112, 121, 122. The worker execution stream, at block 202, can be executed as a container that includes one or more execution threads associated with a workflow of a workflow service 142. In some implementations, the execution stream can include one or more virtual machines, one or more execution containers, one or more processing threads, or one or more processes. At block 204, the worker execution stream 111, 112, 121, 122 can receive from the workflow service 142, a task and data associated with the task. This can include, at block 205, receiving, by the worker execution stream 111, 112, 121, 122 from the workflow service, the definition of the task. In some implementations, this can also include receiving, by the worker execution stream 111, 112, 121, 122 from the workflow service, one or more parameters for executing the task. Upon receiving the task (i.e., a task definition assigned to it by the workflow service), the worker execution stream 111, 112, 121, 122 can, at block 206, determine whether to divide the task into a set of sub-tasks. Determining whether to divide the task into subtasks at block 206 can include, at block 207, the worker execution stream 111, 112, 121, 122 determining whether the definition of the task satisfies a predetermined criterion. For example, the criterion can be the type of tasks, the correspondence of the task to the computing resources available to the worker 111, 112, 121, 122, a parameter of the task, etc. The determination whether the definition of the task satisfies a predetermined criterion can include matching an attribute of the task with a corresponding attribute of the worker execution stream 111, 112, 121, 122. The worker execution stream's determination, at block 206, of whether to divide the task into the set of sub-tasks can be performed based on one or more factors including the data associated with the task (e.g., the values of one or more parameters of the task), the resources available to the worker execution stream 111, 112, 121, 122, and the resources available to one or more other worker execution streams 111, 112, 121, 122. In some implementations, the resources available to the worker execution stream 111, 112, 121, 122 can depend on parameters of one or more tasks received by the worker execution stream 111, 112, 121, 122 and the resources available to one or more other worker execution streams 111, 112, 121, 122 can depend on whether the one or more other worker execution streams 111, 112, 121, 122 have received (i.e., from the workflow service 142) a task to perform.

Responsive to determining, at block 206, that the task satisfies the predetermined criterion, the worker execution stream 111, 112, 121, 122 can, at block 208, divide the task into a set of sub-tasks. The worker execution stream 111, 112, 121, 122 can, at block 209, generate a definition of a sub-task workflow for the set of sub-tasks. For example, the worker execution stream 111, 112, 121, 122 can generate a sub-task graph (i.e., sub-task DAG) defining a sub-task workflow for the set of sub-tasks. In some implementations, generating the definition of a sub-task workflow can include the worker execution stream 111, 112, 121, 122 generating a sub-task graph defining the sub-task workflow in a text-based file format. The worker execution stream 111, 112, 121, 122 can also, at block 210, cause the workflow service 142 to distribute, based on the definition of the sub-task workflow, the sub-tasks of the set to one or more worker execution streams 111, 112, 121, 122 for execution. For example, at block 211, the worker execution stream 111, 112, 121, 122 can transmit the sub-task graph and parameters of the sub-task workflow to the workflow service 142 to distribute the sub-tasks of the set respectively to one or more worker execution streams 111, 112, 121, 122 for execution. Responsive to the worker execution stream 111, 112, 121, 122 determining, at block 207, that the task does not satisfy the predetermined criterion, the worker execution stream 111, 112, 121, 122 can determine not to divide the task into a set of sub-tasks. For example, responsive to the worker execution stream 111, 112, 121, 122 determining, at block 207, that the task does not satisfy the predetermined criterion, the worker execution stream 111, 112, 121, 122 can, at block 212, execute the task itself without generating a new sub-task DAG.

In some implementations, the worker can receive a task along with the parameters and data for performing the task as an input. If the worker decides to divide the task into a set of sub-tasks, the original tasks can become the root task for that set of sub-tasks will not be considered complete (i.e., the DPP 140 will not notify external services of its completion) until all sub-tasks have been executed.

Each sub-task can also have multiple levels of its own sub-tasks each of which can also be represented by a DAG. Prior to a worker beginning to execute a sub-task, the data with which it was created and the results of the execution of its parent task(s) can be provided as input to the worker. In some implementations, sub-tasks can be performed strictly sequentially going from parent task to child task (i.e., a sub-task generated by a worker to whom the parent task was assigned), with tasks of the same level/depth (i.e., within the parent-child hierarchy) being performed in parallel. A multi-parent task can be set not to start (i.e., include instructions such that a worker will not begin executing it) until all parent tasks have been completed. Similarly to the root task from which it was generated, the execution of any sub-task can output not only a result of the execution, but also additional child tasks if the worker decides to subdivide the root task into further sub-tasks.

Subtasks can, in some cases, be executed by workers other than the worker who created the sub-task graph. The worker for performing a given sub-task can be specified when the sub-task is created. For example, the worker for performing the given sub-task can be indicated by specifying the type of worker by which the sub-task can be performed (e.g., by indicating a worker address, name, version, method-in-worker, etc.) The order in which tasks and sub-tasks are executed (i.e., the worker queue) can be determined by the workflow service in the DPP. A worker can be uninformed of whether it is performing a task or a sub-task.

As noted above, a component service of the DPP 140 is the workflow service 142 whose function is to perform the task sequences (i.e., workflows) passed to it for execution by the workers. In some implementations, a workflow definition can be included as static document that describes what steps are included in a workflow. RunJob and RunWorkflow are types of workflow steps often used in workflow definitions where RunJob invokes the worker which is assigned to execute a task and RunWorkflow executes a workflow or a nested (child) workflow.

In some implementations, because the interactions between the workers and the DPP can occur through the workflow service 142, the execution of the various tasks in a workflow by respective workers can occur asynchronously, without each respective worker waiting for the result of the execution of tasks by workers (unless there is a dependency relation between the tasks).

In some cases, when a worker decides to divide a task into a set of sub-tasks, it is possible that one or more of those sub-tasks can be assigned to that same worker for subsequent execution. Furthermore, when a worker decides to divide a task into a set of sub-tasks, the worker outputs a sub-task graph defining the set of sub-tasks and transmits it to the workflow service. When a worker outputs the sub-task graph (i.e., sub-task DAG), the workflow service receives it and validates in accordance with pre-determined parameters. For example, the workflow service can receive a sub-task graph in the form of a JSON file from a worker and can check if this JSON represents a valid graph of sub-tasks. The workflow service can verify that the sub-tasks are assigned to existing workers, that there is a Join sub-task, and that there are no orphaned sub-tasks etc. Having determined that the sub-task DAG is valid, the workflow service can distribute the sub-tasks from the graph for execution among workers.

In some implementations, after completing a task, workers are (i.e., by default) in workflow service mode to see if there is another task for them. Accordingly, the default idle state of a worker can be such that at a certain predetermined frequency the worker continually inquires the workflow service whether there are any tasks for the worker to execute (e.g., workers can poll the workflow service for new jobs in an infinite loop).

The results of the work of all sub-tasks can be transmitted as input to a worker assigned to execute a sub-task of a special type called Join. A Join sub-task can processes the results of the executed sub-tasks in a given sub-task DAG and output the final result of the parent task or root task that created the sub-task DAG. The completed execution of a loin sub-task can explicitly define the completion point of a sub-task graph of any kind, simplify the topology of sub-tasks, and generates the end result of the task that from which the set of sub-tasks was created.

As used herein, a parent task is a task on which a sub-task (i.e., a child sub-task relative to the parent sub-task) directly depends. Accordingly, a parent task of sub-task A can be either the task from which sub-task A was created or a task located at any adjacent vertex higher in the sub-task graph than that parent task. In other words, for sub-task N, a parent task refers to any task M directly above sub-task N in the workflow hierarchy (as represented in its DAG) from which sub-task N depends (e.g., by having been created from M or which uses the outputs of M as inputs.) Thus, a sub-task can have more than one parent task. Accordingly, a child sub-task refers to a sub-task for which a parent task is defined according to the foregoing definition. A child sub-task can be a dependent sub-task relative to its parent task.

In some implementations, a different type of sub-task called Autojoin sub-task can be used. An Autojoin sub-task can refer to a Join sub-task that merges all the results of parent sub-tasks into one result by simple unification. In some implementations, instead of being executed by a worker, an Autojoin sub-task can be executed by the workflow service when all of its parent sub-tasks are completed. For example, if a Join task is to simply unify (i.e., merge) all incoming results, it can be marked as an Autojoin task and be executed by the workflow service itself without being assigned to a worker for execution. An advantage of using an Autojoin sub-task is the absence of overhead associated with the interaction of workers and the workflow service when receiving a task and transmitting a resulting output, as well as the absence of the need to implement logic for combining the results of sub-tasks. In some implementations, the Autojoin sub-task can be used as a convenient and effective plug in scenarios where the graph consists of only one sub-task, since graphs are completed by having some type of a final Join/Autojoin sub-task.

Figure 5:
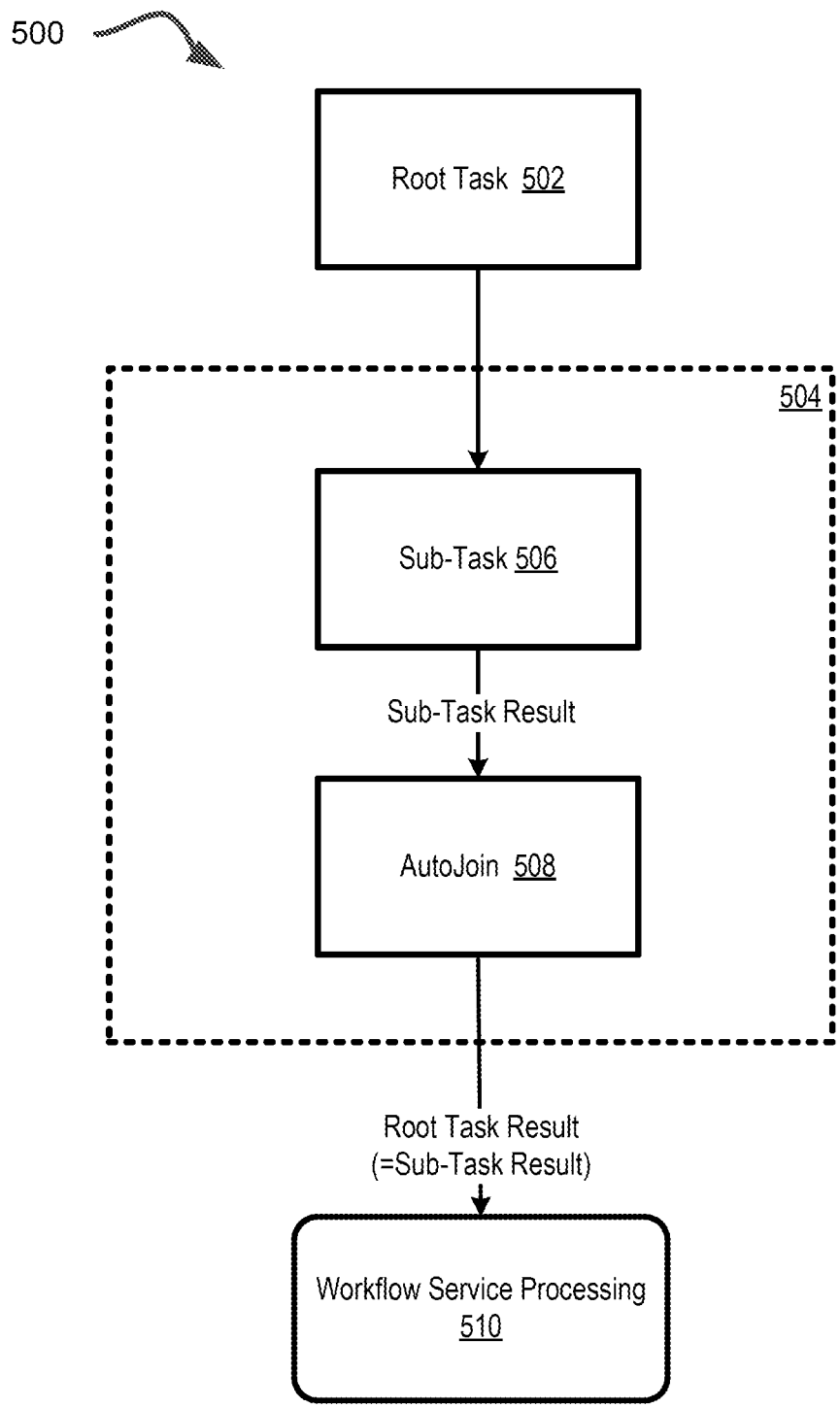
FIG. 5 is an example flow diagram depicting the performance of an AutoJoin sub-task, in accordance with some implementations of the present disclosure.

The use of the Autojoin sub-task can be seen in FIG. 5 which is an example flow diagram (i.e., DAG) 500 depicting the performance of an AutoJoin sub-task, in accordance with some implementations of the present disclosure. As shown in the figure, from a root task at block 502, a sub-task graph 504 is created with a single sub-task in block 506. However, since the root task at block 502 was divided into only one constituent sub-task in block 506, the graph 504 also includes an Autojoin sub-task in block 508. Accordingly, the result of the execution of the sub-task in block 506 can be output and provided as input for executing the Autojoin sub-task in block 508. Subsequently, the result of the execution of the Autojoin sub-task in block 508 can be considered to be the result of the execution of the root task of block 502 and transmitted for further processing by the workflow service at block 510.

In various implementations, the data that comes to a worker from the workflow service for the execution of a task can be referred to as a WorkItem. Accordingly, a WorkItem can be a data object that combines the initial workflow state specified in the workflow definition with the results of all previously completed workflow tasks. In some implementations, a Work/tem can be a data object such as a dictionary that is initialized with an initial state of the workflow into which the results of other tasks of the workflow can be input. The WorkItem can also serve as an input parameter for the tasks in a given workflow. Therefore, in some implementations the WorkItem can include all initial parameters used by a worker to begin executing the first task in a workflow. As workers execute the tasks in the workflow, the results of the executions of the tasks can be added into the WorkItem data structure and passed on to the worker performing the next task in the workflow. The WorkItem object provided to the worker responsible the creation of the sub-task is the WorkItem object used in the execution of the sub-task. If the sub-task depends on other sub-tasks, the results of the parent sub-tasks can be entered into to the WorkItem prior to the execution of the sub-task.

The worker's application programming interface (API), which provides functionality and interaction with the DPP and other workers, can include the following components:

When creating sub-tasks, the worker can output a result type referred to as SubTaskResult. The structure of SubTaskResult can include two fields: SubTasks—which is a flat array of sub-tasks of the SubTask type; and Join—a join sub-task that combines the results of sub-tasks from SubTasks. For example SubTaskResult can be represented in the form of {"SubTasks": [SubTask1, SubTask2, SubTask3], "SubTaskJoin": SubTaskJoin}. The structure of the SubTask object can include the following attributes: Key—a key for the sub-task generated by the worker, that is unique within the bounds of the graph being created; WorkerAddress—which is an address of the worker that is to execute the sub-task that can include the worker name, the worker version, and the worker path indicating a method name inside the worker; State—containing data that will be passed to the worker as a Work Item including the initial parameters for the execution of the sub-task; DependentKeys—an array of keys of child sub-tasks (i.e. sub-tasks that are to be executed after the completion of the instant sub-task, to which the resulting output of the instant sub-task is to be transmitted, and which wait for the instant sub-task to be completed prior to beginning to be executed). In some implementations, the structure of the SubTaskJoin object can include the same fields as SubTask object with the exception of DependentKeys, because Join is the final sub-task of the graph and may not have any dependent sub-tasks.

With the entities defined above, the following conditions can be met. A worker can also output a set of sub-tasks as the result of the execution of a task. A set of sub-tasks can be represented by a DAG. Subtasks can respectively be executed by a different worker than the worker which created them. The data with which a sub-task was created, and the results of the execution of its parent sub-tasks can be provided as inputs to a worker for the execution of the sub-task. A sub-task can be placed into a queue when all of its parent sub-tasks are complete. The results of sub-tasks can be passed from a worker executing a parent task to a worker executing child task without combining the results into one global result at the level of the parent task. For example, a child sub-task can receive a dictionary from the results of the execution of its parent tasks and can decides how to convert the multiple results into one. A sub-task graph can be defined to end with a Join sub-task. An output of an execution of a sub-task can also be a set of sub-tasks. Subtasks can be executed strictly sequentially from parent to child with sub-tasks of the same level being executed in parallel. A sub-task with several parent tasks can wait to begin execution until all of its parent tasks have been executed. A task can be referred to as completed when all of its child sub-tasks have been completed. Examples of workflows and graphs using the foregoing elements are described in more detail below with reference to FIGS. 3-14.

Figure 3:
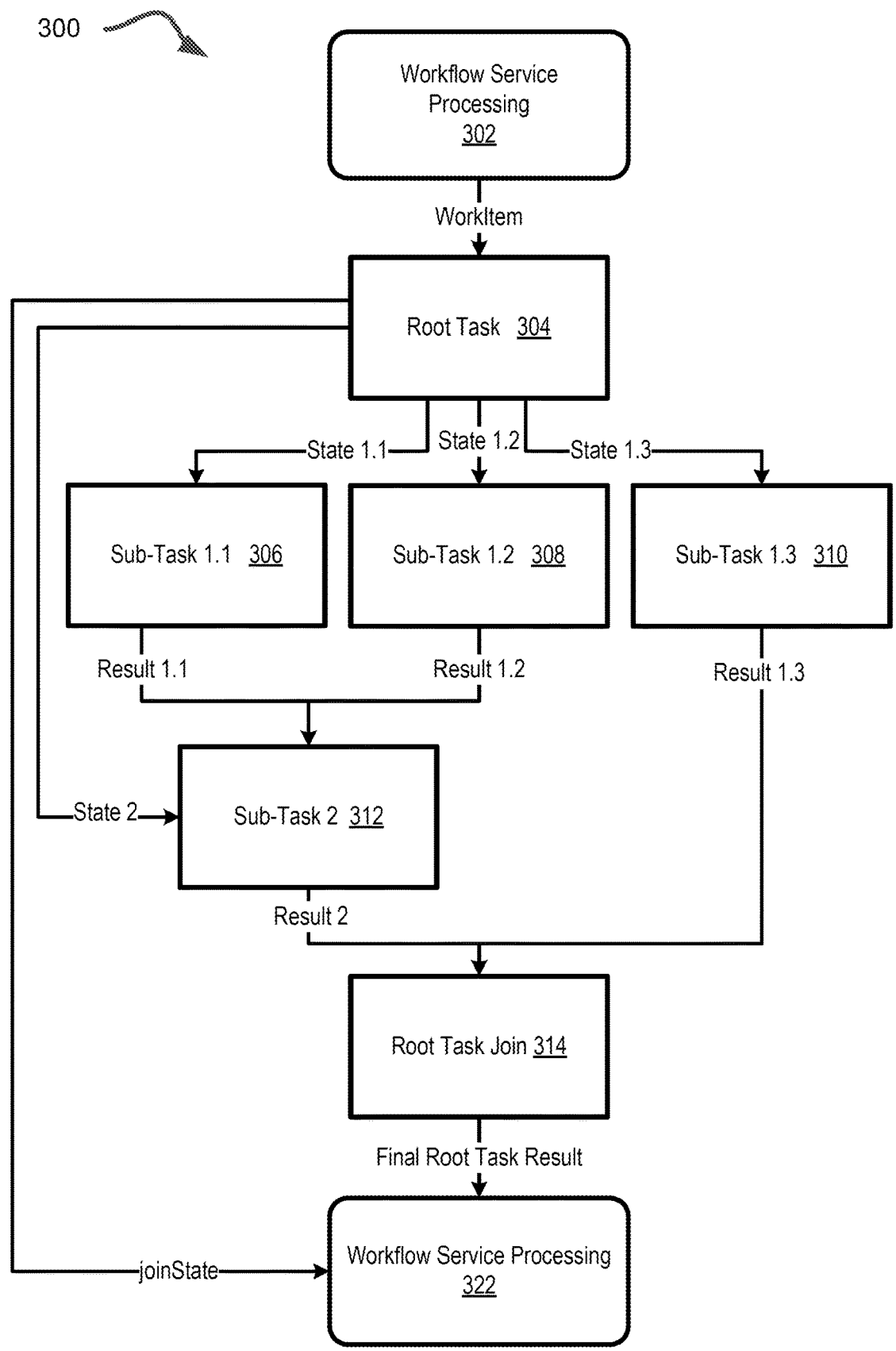
FIG. 3 is an example flow diagram depicting a graph of tasks in accordance with some implementations of the present disclosure.

FIG. 3 is an example workflow 300 diagram depicting a graph of tasks in accordance with some implementations of the present disclosure. At block 302, DPP can transmit the WorkItem from the workflow service to the worker for the worker to execute the root task at block 304. At block 304 the sub-task graph can be generated by the worker. For example, the worker assigned to execute the root task at block 304 can generate four sub-tasks, SubTask 1.1 306, SubTask 1.2 308, SubTask 1.3 310, SubTask 2 312, and Subtask RootTaskJoin 314 and include them in a sub-task DAG.

In some implementations, each of the workers that are to respectively execute each of the child sub-tasks can receive the initial state of the child sub-task and data associated with the child sub-task from the worker executing the parent sub-tasks. For example, sub-task 2 312 can, at block 312, receive State2 (i.e., data associated with sub-task 2 when sub-task 2 was created) from the root task, as well as result 1.1 output by the worker that executed sub-task 1.1 at block 306 and result 1.2 output by the worker that executed sub-task 1.2 at block 308.

In addition to passing the State2 to the worker that is to execute sub-task 2, the worker executing the root task at block 304 can also transmit the joinState values to the worker that is to execute the RootTaskJoin sub-task at block 314. At block 314, the RootTaskJoin sub-task can merge the results of the execution of sub-task 2 obtained at block 312 and the results of the execution of sub-task 1.3 310 (i.e., the direct parent sub-tasks of the RootTaskJoin sub-task) and output the final root task result as the final resulting output of the execution of root task 304 to the workflow service of the DPP at block 322. Further details concerning the creation of sub-tasks are provided below with reference to FIG. 4.

Figure 4:
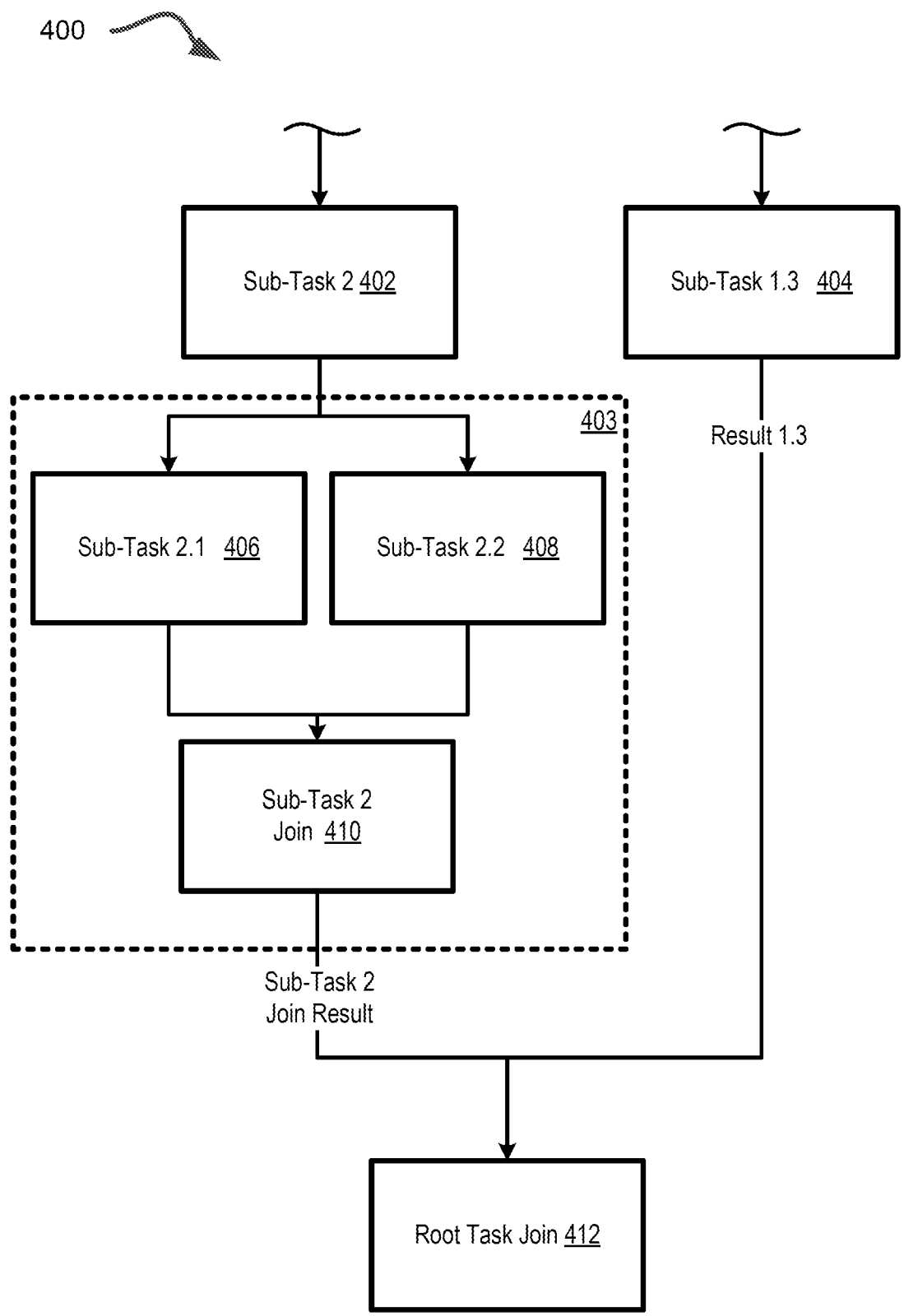
FIG. 4 is an example flow diagram depicting the creation and ordering of sub-tasks in accordance with some implementations of the present disclosure.

FIG. 4 is an example workflow 400 diagram depicting the creation and the order of execution of sub-tasks, such as the sub-tasks shown in FIG. 3, in accordance with some implementations of the present disclosure. As can be seen, at block 402, the execution of sub-task 2 402 can result in the output of a sub-task graph 403, which includes sub-task 2.1 in block 406, sub-task 2.2 in block 408, and SubTask2 Join in block 410. In the depicted implementations, RootTaskJoin of block 412 may not start to be executed by a worker until the execution of SubTask2 Join 410 is completed and the results output at the completion of the execution of sub-task 1.3 at block 404 are received.

In some implementations, when the result of the execution of a particular sub-task is generated, potential conflicts between the resulting data and distributed locks do not occur due to the absence of a common global state and due to the initial state being specified in the Work Item at the creation of the root task and each of its constituent sub-tasks being immutable. This approach avoids situations where the result of the execution of each sub-task of a pair of sub-tasks being executed in parallel is a map of keys and corresponding values and where the output of the execution of each of the sub-tasks produce results with matching keys. If their results are to be automatically merged into a global result of the workflow (i.e., a global state of the execution of the workflow represented by the sub-task DAG), the result may be undetermined and can depended on the output of the sub-task the execution of which was completed first. In the described implementations, no global state is updates as the results of the execution of such sub-tasks will be separately transmitted to the workers that are to execute the child sub-tasks of those sub-tasks. The use of Join sub-tasks and the described relationships between the parent sub-tasks and their respective child sub-tasks make the flow of data in the sub-task graph predictable and transparent, simplifying the development and potential debugging of the workflow.

In the described implementations, various database management systems (DBMS) can be used to store the state of sub-tasks. In some cases, for increased performance effectivity, it single-threaded DBMSs can be used, since multi-threaded DBMSs give rise to additional complexity associated with the implementation of distributed locks for tasks with high competitiveness. For example, to keep track of how many parent sub-tasks remain to be executed for a worker to be able to begin execution of sub-task A, a counter can be maintained and decremented upon each completed execution of a parent sub-task. However, because in a multithreaded approach the execution of some of these sub-tasks can be completed simultaneously, a lock for this counter (i.e., to make atomic read-decrement-write operation) may need to be used. Because the lock can incur performance costs and, if implemented inaccurately, can lead to errors that are hard to reproduce and investigate, some implementations can forego the use of locking by using single-threaded DBMS.

In some implementations, up to three keys can be created for each sub-task in the DBMS. One key can be referred to as the Item key and can contain all of the attributes of the sub-task (e.g., workflow ID, parent task ID, worker name, etc.). Another key can be referred to as the Dependents key, which can serve as the identifier of the child sub-tasks of the sub-task. The third key can be referred to as the Input-results key that can be presented in the form of an associative array, where the key is the identifier of the parent sub-task, and the value is its result and metadata. For example, the Input-results key can be presented in the following form: {"ParentSubtaskA": "ResultValue2", "ParentSubtaskB": "ResultValue1", "ParentSubtaskC": "ResultValue1", "ParentSubtaskD": "ResultValue4", "ParentSubtaskE": "ResultValue8"}. Subsequently, when the execution of a task by a worker results in the output of a set of sub-tasks, the following entries are created and stored in the DBMS: a Root Task Item entry which indicates the parent task of the sub-task graph and serves as the root element of the graph; a Subtask Items entries, where reach entry respectively represents a corresponding sub-task (including the Join sub-task) in the set of sub-tasks; a set of Dependents in the form of an array of entries respectively indicating the dependent sub-tasks of the Root Task Item and each of the constituent sub-tasks. For example, if DBMS implements a key-value store, then a key can be created for each entry in Subtask Items and a key can be created for the Root Task Item. Further if a sub-task in the output set of sub-tasks has dependent sub-tasks, a dedicated key can be created that is associated in the record of Dependents with the respective identifiers of the dependent sub-tasks.

In some implementations, when the execution of a task by a worker results in the output of a set of sub-tasks and the sub-task graph being transmitted to the workflow service, in addition to creating new Subtask Items and Dependents for the sub-task graph, the new sub-task graph can be embedded in the its parent graph (i.e. the dependencies of the respective tasks and sub-tasks can be updated). In some cases, the identifiers of sub-tasks (i.e., sub-task IDs) can be assigned by the workflow service. In such cases, the worker(s) can use the sub-task keys as the respective identifiers for the sub-tasks instead of operating with sub-task IDs, both when generating sub-tasks and when processing their results by executing a Join sub-task. This separation in the manner of identifying the sub-tasks provides at least two benefits. It avoids collisions during the generation of global sub-task identifiers, and also allows the worker to not be limited by the format of identifiers in the workflow service. In such cases, the worker can generate a key of any kind and add to it any metadata that may be necessary to identify a sub-task with it when processing the results of the sub-task during the execution of Join sub-task.

Figure 6:
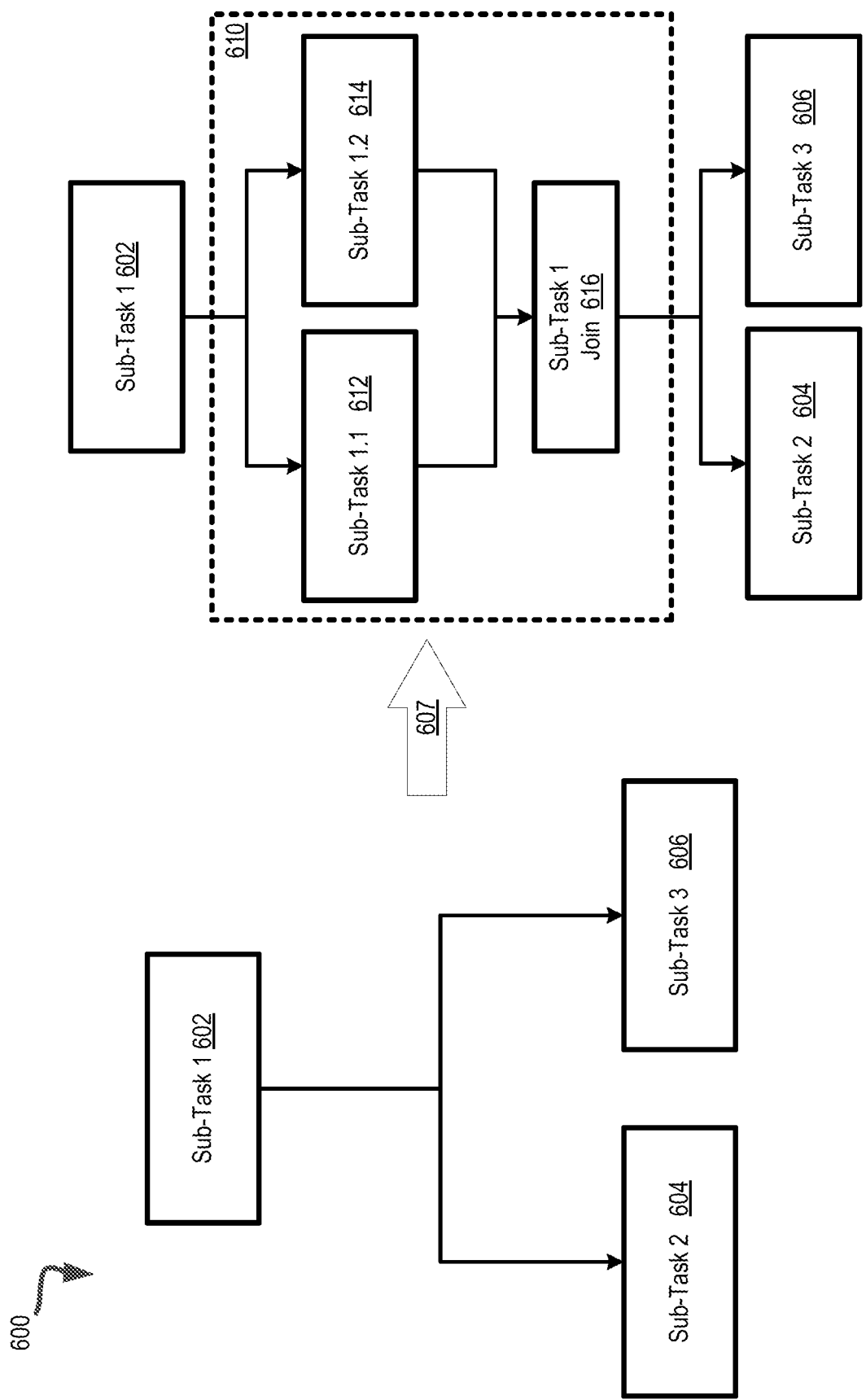
FIG. 6 is an example flow diagram depicting the inclusion of a sub-task graph in a parent graph in accordance with some implementations of the present disclosure.

FIG. 6 is an example workflow 600 diagram depicting the inclusion of a sub-task graph in a parent graph in accordance with some implementations of the present disclosure. Since the DAGs of the various implementations of this disclosure can each terminate with a Join sub-task, embedding a sub-task graph into a parent graph can be reduced to having the dependent sub-tasks of the parent sub-task become dependent sub-tasks of the Join sub-task of the sub-task graph. In the depicted example, sub-task 1 in block 602 has sub-task 2 in block 604 and sub-task 3 in block 606 as dependent sub-tasks.

At block 607, the worker executing sub-task 1 in block 602 can create a sub-task graph 610. Consequently, dependent sub-tasks, sub-task 2 in block 604 and sub-task 3 in block 606 go from being directly dependent from sub-task 1 602 being directly dependent from SubTask1Join 616. This dependency relationship is used by the workflow service since, in some implementations, the workflow service queues task in the workflow task queue only when all of its parent tasks are complete. Additional descriptions below made with reference to FIGS. 7 and 8 further explain how the workflow service controls the process in accordance with some implementations.

In some implementations, when determining the order of the execution of sub-tasks, a value indicating the priority of the respective sub-tasks can be used. In some cases, the priority value of a particular sub-task can be the start time of the execution of the workflow of parent task of the sub-task. Accordingly, in such cases, the tasks of a workflow that began to be executed earlier can have a higher priority than the tasks of a workflow that began to be executed later. In this manner, situations where workflows whose execution started later fill the workflow service queue with their constituent tasks and prevent the completion of tasks of a workflow whose execution started earlier are prevented. Because sub-tasks exist at a particular level of a workflow nesting hierarchy (i.e., workflow>task>sub-task), the priority of a particular sub-task can be inherited from the priority of its parent task (i.e. the priority value of the sub-task can also equal to the start time of the workflow that includes the task from which the sub-task was created). Therefore, the advantage of performing the workflows the execution of which started earlier is preserved. Accordingly, in some implementations, sub-tasks that are created within the same workflow can have the same priority and can be executed in parallel. The nesting level (i.e., depth level in the DAG) of a sub-task can determine when the sub-task will be placed in the queue of the workflow service, but may not affect its priority.

The successful completion of the sub-task graph can occur upon the determination of whether the completed sub-task is a final Join sub-task (e.g., a RootTaskJoin sub-task). This is because, in some implementations, every DAG in a workflow can be generated to end with a Join sub-task. Accordingly, to coordinate the process of determining the final Join sub-task of a workflow, each Join sub-task can, in some implementations, be defined by the RootId property. The RootId can point to or indicate the sub-task (or root task) from which the first Join sub-task in a given branch of the graph was created. The use of the RootId property in some implementations is described in more detail with reference to FIG. 7.

Figure 7:
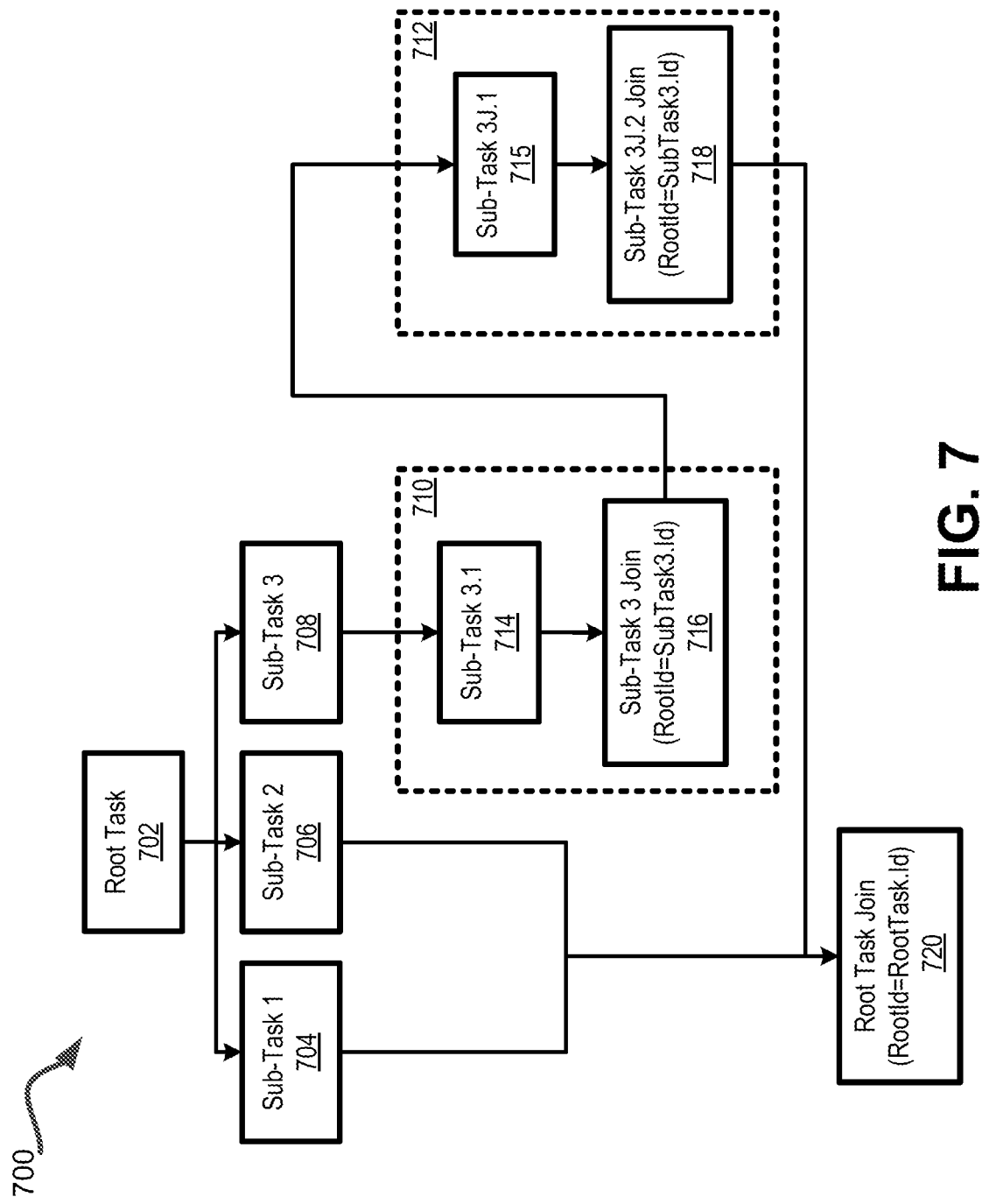
FIG. 7 is an example flow diagram depicting the use of the RootId property to determine the completion of the execution of a sub-task graph in accordance with some implementations of the present disclosure.

FIG. 7 is an example workflow 700 diagram depicting the use of the RootId property to determine the completion of the execution of a sub-task graph in accordance with some implementations of the present disclosure. As illustrated in the example, the Root/d for RootTaskJoin sub-task in block 720 is the RooTaskId of the root task in block 702. Accordingly, if the execution of the RootTaskJoin sub-task of block 720 by a worker creates a new sub-task graph, then the final Join sub-task of that new sub-task graph will also have a RootId that refers to the root task (i.e. the RootId of the final Join sub-task of that new sub-task graph will be equal to the RootTaskId of the root task of block 702). While in the depicted example, the execution of sub-task 1 in block 704 and sub-task 2 in block 706 does not result in the creation of a new sub-task graph, the execution of sub-task 3 in block 708 creates the sub-task graph 710 in which the RootId of the sub-task 3 Join sub-task in block 716 coincides with (i.e., is defined to be) the SubTask3Id of Subtask 3 in block 708. Consequently, in the sub-task graph 712, created as a result of the execution of the sub-task 3 Join sub-task in block 716, the RootId of the last SubTask3Join sub-task in block 718 will also match the SubTask3Id of sub-task 3 in block 708.

Accordingly, when the execution of each sub-task is completed successfully, the sub-task can be checked to see whether it is a Join sub-task and whether its RootId is equal to the RootId of its root task. If so, the result of that sub-task is the result of the parent task, and the parent task can be determined to be completed. In some implementations, if an error occurs while a worker is executing a sub-task, or if the worker explicitly sends the "Failed" status to the workflow service as a result of sub-task execution, all child sub-tasks and the root task of that sub-task can terminated with the same failure status.

To control the use of computing resources, restrictions on the generation of sub-tasks by the worker can be input to the worker when a task is assigned to it. The restrictions can be defined by the number of sub-tasks that are permitted to be created by the worker during the execution of the task and by the maximum depth (i.e., nesting level depth) of the sub-task creation graph as described in more detail with reference to FIG. 7. The number of sub-tasks can be calculated as the sum of all sub-tasks of the of the sub-task creation graph (excluding the Join sub-tasks) created by the worker and output in the form of a SubTaskResult object at a single time. For the calculation of the total number of sub-tasks created by a worker, the respective sub-tasks of different sub-tasks of the same task are not summed up (i.e., only the sub-tasks in the sub-task set created directly as a result of a worker's execution of a parent task are calculated in the determination of sum of the number of sub-tasks created by a worker at single time).

A sub-task creation graph is a graph in which each node represents the sub-task graph (i.e., DAG) output resulting from a worker's execution of a sub-task (i.e., SubTaskResult data object). Thus, all sub-tasks of the same SubTaskResult can have the same depth value. Subtasks created by the worker directly during the execution of a task can have a depth of 1.

Figure 8:
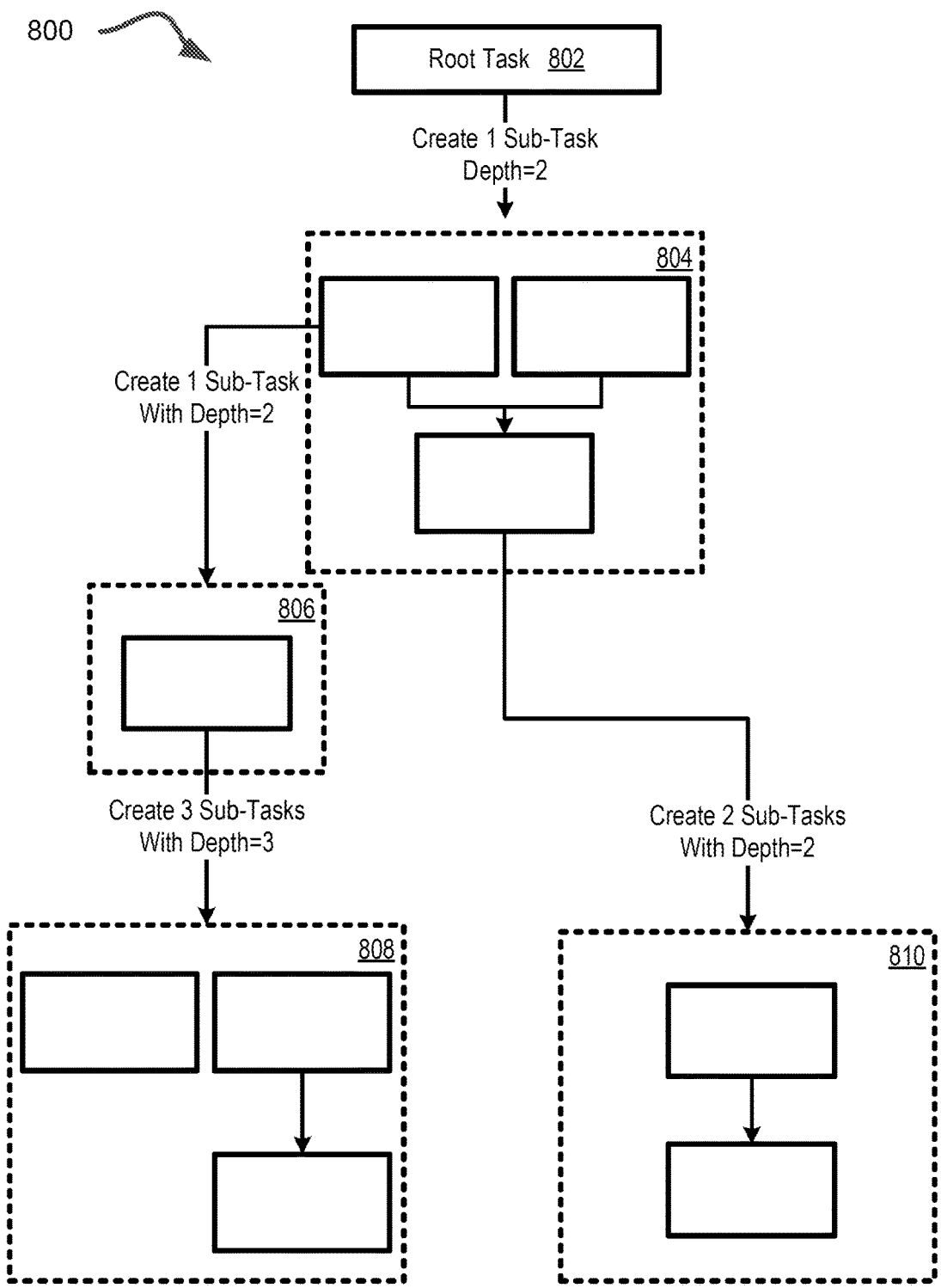
FIG. 8 is an example flow diagram depicting the creation of sub-tasks by a root task at different depths, in accordance with some implementations of the present disclosure.

FIG. 8 is an example flow diagram depicting the creation of sub-tasks by a root task at different depths, in accordance with some implementations of the present disclosure. The worker executing the root task of block 802 can create a sub-task graph 804 containing three sub-tasks with depth=1 (i.e., the sub-tasks of sub-task graph 804 created by the worker directly as a result of the execution of root task of block 802 have a depth value of 1). Further, a worker executing a sub-task of sub-task graph 804 (i.e., SubTaskResult of Root Task 802) can create sub-task graph 806 having one sub-task with depth=2 and sub-task graph 810 having two sub-tasks with depth=2. Similarly, a worker executing a sub-task of sub-task graph 806 can create sub-task graph 808 having three sub-tasks with depth=3. Accordingly, the depth value is an indicator of nesting depth relative to the root task 802. Thus, all sub-tasks of the same SubTaskResult can have the same depth value.

In some implementations, when creating and executing sub-tasks in the DPP, it may be useful to track the progress of the execution of a task. This may be useful for receiving feedback while tasks are being executed, because some tasks that are divided into constituent sub-tasks can take a long time to complete. The algorithm for calculating the progress of tasks, regardless of the complexity of the sub-task graph (i.e., number of nodes and levels), can be described as follows. If the execution of a parent task/sub-task creates sub-tasks, the created sub-tasks can be assigned a relative weight value (e.g., the weight values can be either assigned explicitly or equal weight values can be assigned automatically to all the sub-tasks including the Join sub-tasks). The absolute weight A of a sub-task can be calculated as the product of the weight of its parent sub-task $A_P$ and the relative weight R of the sub-task such that $A=A_P*R$. Thus, if the execution of a sub-task by a worker does not create a sub-task, then its weight is added to a value reflective of the overall progress of the task. Tracking the progress of the execution of a task can be further understood with reference to FIG. 9.

Figure 9:
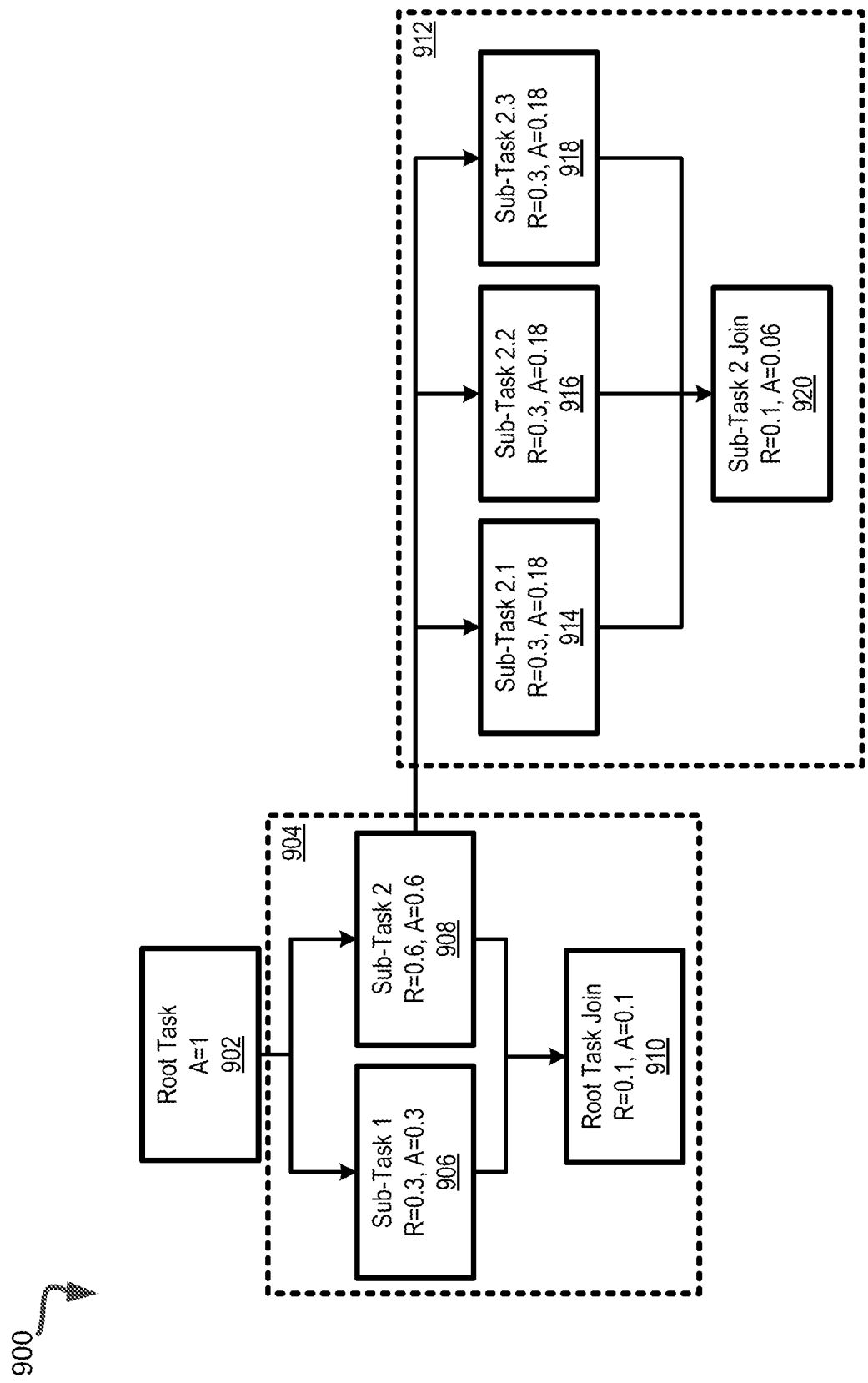
FIG. 9 is an example flow diagram depicting the sub-tasks having various weights in accordance with some implementations of the present disclosure.

FIG. 9 is an example workflow 900 diagram depicting the sub-tasks having various weights in accordance with some implementations of the present disclosure. In the depicted example the root task in block 902 has an absolute weight A equal to 1 (i.e., A=1). Consequently, the execution of root task in block 902 can cause a worker to create three sub-tasks in sub-task graph 904, and assign weight values summing to 1 in total among the respective relative weights R of each of the three sub-tasks. Thus, sub-task 1 of block 906 receives a relative weight R=0.3, resulting in an absolute weight A=1*0.3=0.3; sub-task 2 of block 908 receives a relative weight R=0.6, resulting in an absolute weight A=1*0.6=0.6; and the Root Task Join sub-task of block 910 receives a relative weight R=0.1, resulting in an absolute weight A=1*0.1=0.1.

As depicted, the total weight of the sub-task graph 904 is 1, as that is the sum of the absolute weights A of all of the constituent sub-tasks and is equal to the weight value A=1 of the parent root task of block 902. Consequently, the execution of sub-task 2 of block 908 by a worker can cause the worker to create a sub-task graph 912, and to distribute a weight summing up to 1 among four relative weights R of the respective sub-tasks in the sub-task graph 912. Thus sub-task 2.1 of block 914 receives a relative weight R=0.3, resulting in an absolute weight A=0.6*0.3=0.18; sub-task 2.2 of block 916 receives a relative weight R=0.3, resulting in an absolute weight A=0.6*0.3=0.18; sub-task 2.3 of block 918 receives a relative weight R=0.3, resulting in an absolute weight A=0.6*0.3=0.18; and the SubTask2 Join sub-task of block 920 receives a relative weight R=0.1, resulting in an absolute weight A=0.6*0.1=0.06. Accordingly, the total weight of the sub-task graph 912 is 0.6, which is the sum of the absolute weights A of all of its constituent sub-tasks and is equal to the weight value A=0.6 of its parent sub-task 2 of block 908.

In the depicted example, at the end of the execution of sub-task 1 of block 906, its absolute weight A can be added to the overall progress indicator value. Notably, the absolute weight of A of sub-task 2 of block 908 will be taken into account in the overall progress only when the execution of all of the sub-tasks of the sub-task graph 912 is completed, and the absolute weight 0.4 of Root Task Join sub-task of block 912 will be taken into account when the root task of block 902 is itself completed. Thus, in the various implementations, the workers can be completely abstracted from the type of task they are executing.

Figure 10:
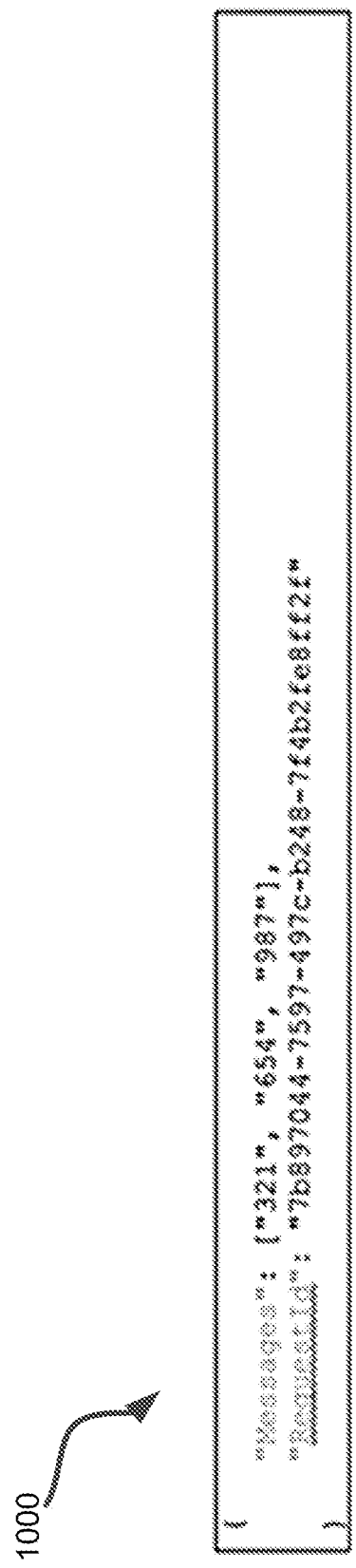
FIG. 10 is a diagram depicting an example of the raw data provided for a task performed through the execution of sub-tasks by workers, in accordance with some implementations of the present disclosure.

The implementations of the present disclosure are further described with reference to FIGS. 10-15 in the context of examples of scenarios that include workers executing sub-tasks. The example scenarios have the same goal but use sub-tasks in different ways. The input and goal or objective of the various scenarios can be described as follows. As input, the MainWorker retrieves an array of messages and a unique identifier for a request (i.e., requestID). The objective is to present each message separately in reverse order, combine the resulting messages into one, count the total number of letters in the resulting message, and output the request ID received at the input. FIGS. 9 and 10 show examples of the input and the result respectively.

Figure 11:
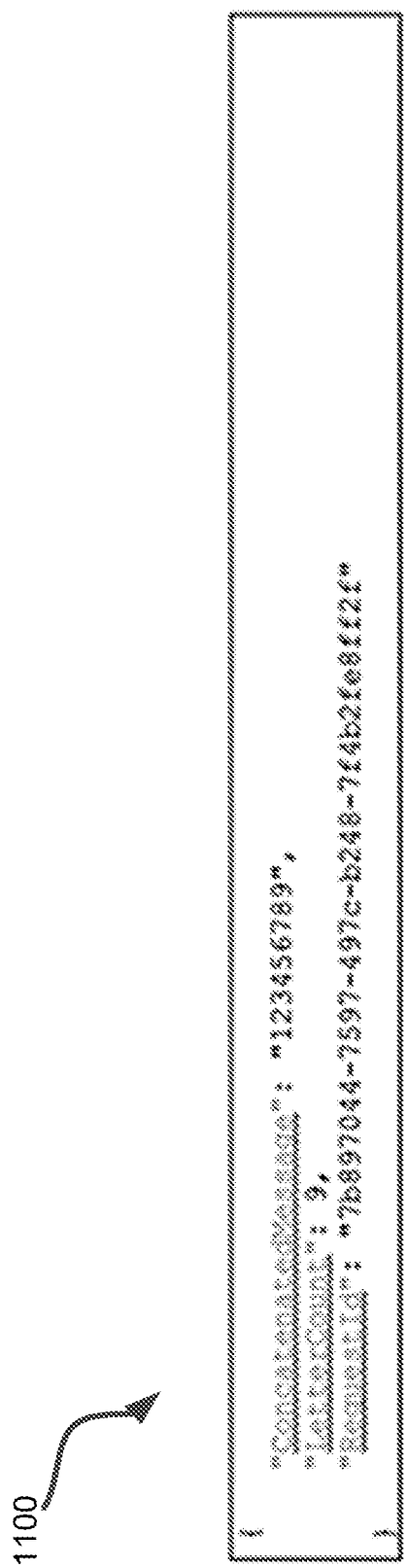
FIG. 11 is a block diagram depicting an example expected result obtained for a task performed through the execution of sub-tasks by workers in accordance with some implementations of the present disclosure.
Figure 12:
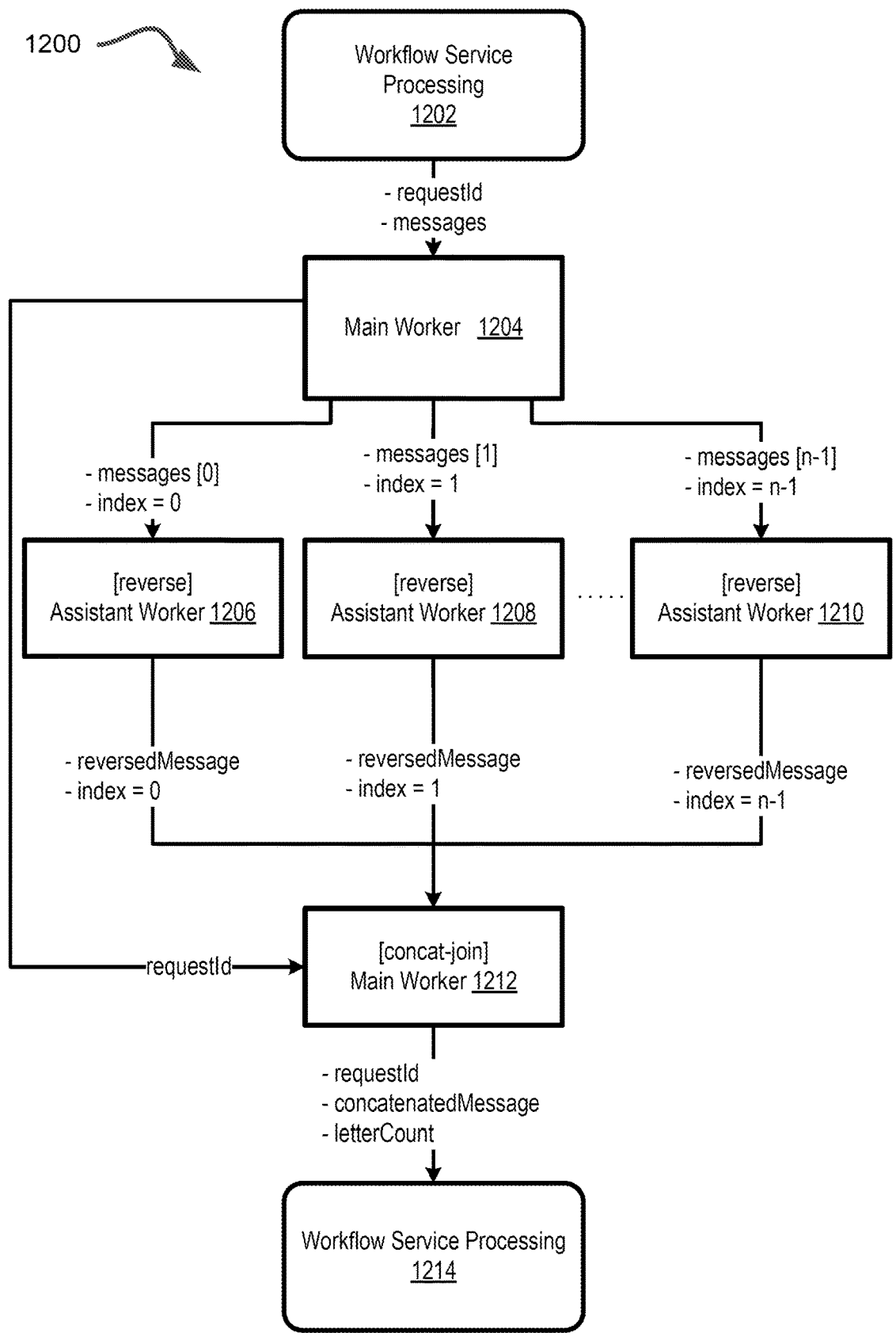
FIG. 12 is an example flow diagram depicting the execution of sub-tasks by workers to create a flat army of data in accordance with some implementations of the present disclosure.

FIG. 10 is a diagram depicting an example of the raw data 1000 provided for a task performed through the execution of sub-tasks by workers, in accordance with some implementations of the present disclosure. FIG. 11 is a diagram depicting an example expected result 1100 obtained for a task performed through the execution of sub-tasks by workers in accordance with some implementations of the present disclosure, FIG. 12 is an example workflow 1200 diagram depicting the execution of sub-tasks by workers to create a flat array of data in accordance with some implementations of the present disclosure. In the example, a worker uses sub-tasks to parallelize the work of presenting messages in reverse order. After receiving the processed messages, the worker combines the resulting messages into one, counts the number of letters and generates the result.

In the illustrated implementation, the MainWorker of block 1204 can receive input from the workflow service of the DPP of block 1202 that includes a requestId and multiple messages (e.g., the input 1000 of FIG. 10). Based on its programming and the parameters of the received task, The MainWorker of block 1204 can create three sub-tasks for each message to present each of them respectively in reverse order. For each of these sub-tasks, the creation of the reverse representation of the message can performed by an AssistantWorker of blocks 1206, 1208, and 1210 respectively. Further, MainWorker (1004) indicates that it will execute the Join sub-task itself at block 1212 by assigning its own Name and Version the WorkerAddress parameter the Join sub-task when it is created, and transmits to itself (i.e., through the workflow service) the Join sub-task the RequestId that the task requires to be output at the completion of its execution.

At each of blocks 1206, 1208, and 1210 respectively, the AssistantWorker receives each respective message, presents it in reverse order, and outputs the result along with the message index to the MainWorker in block 1212. When all the messages have been processed and output by the AssistantWorker, the resulting outputs can be provided as input for the execution of the Join sub-task by the MainWorker at block 1212 along with the RequestId transmitted when the sub-tasks were created in block 1204. Accordingly, at block 1212, the MainWorker itself combines the received messages into one, counts the number of letters in it and outputs, along with the RequestId, the final result to the workflow service in block 1214.

Figure 13:
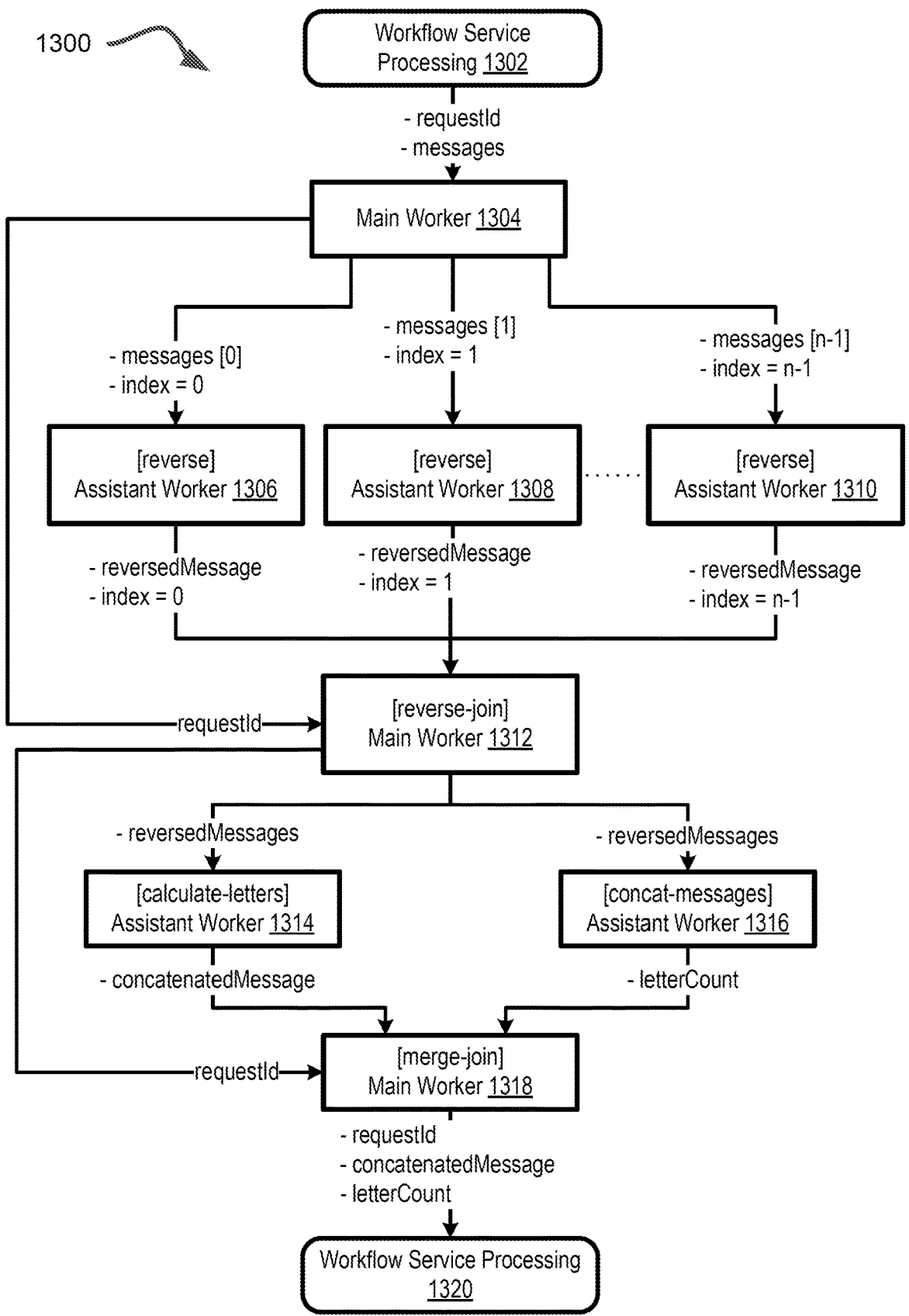
FIG. 13 is an example flow diagram depicting the execution of sub-tasks by workers to create a flat array of sub-tasks, retrieve the result, and recreate sub-tasks, in accordance with some implementations of the present disclosure.

FIG. 13 is an example flow diagram depicting the execution of sub-tasks by workers to create a flat array of sub-tasks, retrieve the result, and recreate sub-tasks, in accordance with some implementations of the present disclosure. In contrast to the previous example, this example uses two Join sub-tasks. In this example, when the MainWorker receives the messages as inputs for a Join sub-task, it transmits to the AssistantWorker sub-tasks for merging the messages for counting the number of letters respectively. After receiving the results from the AssistantWorker, the MainWorker combines them into a single object and outputs the result as the final result of the task.

More specifically, the MainWorker at block 1304 can receive from the workflow service of the DPP in block 1302 a requestId and messages as input such as those depicted in FIG. 10. The MainWorker can then, at block 1304 create three sub-tasks, one respectively for each message, to present each message in reverse order. For each message (provided as input into one of the created sub-tasks), the sub-task of presenting the received text in reverse order is executed by the AssistantWorker respectively at blocks 1306, 1308, and 1310.

Subsequently, the MainWorker, at block 1312, can receive from the AssistantWorker of blocks 1306, 1308, and 1310 respectively the messages presented in reverse order and can merges the received messages into one by executing the first Join sub-task (i.e., the reverse-join sub-task). At block 1312, the MainWorker can create two sub-tasks for the AssistantWorker to execute: one sub-task for concatenating the messages together into one at block 1316 and the other sub-task for counting the number of letters in the message at block 1314. At block 1312, the MainWorker 1312 can also indicate that it expects to receive the results of these two sub-tasks as inputs for the second Join sub-task (i.e., merge-join sub-task) at block 1318 by transmitting the requestId upon creating the second Join sub-task.

The AssistantWorker, in parallel, counts the number of letters in the message at block 1314, combines the messages into one at block 1316, and then transmits the results for the MainWorker to receive at block 1318. At block 1318, the MainWorker combines the results obtained from the AssistantWorker of blocks 1314 and 1316 respectively along with the requestId and outputs the final result to the workflow service at block 1320.

In some implementations, the last task of merging the results performed by MainWorker at block 1318 can be performed automatically by the workflow service executing an Autojoin sub-task. The following example described with reference to FIG. 14 explains the use of such a capability.

Figure 14:
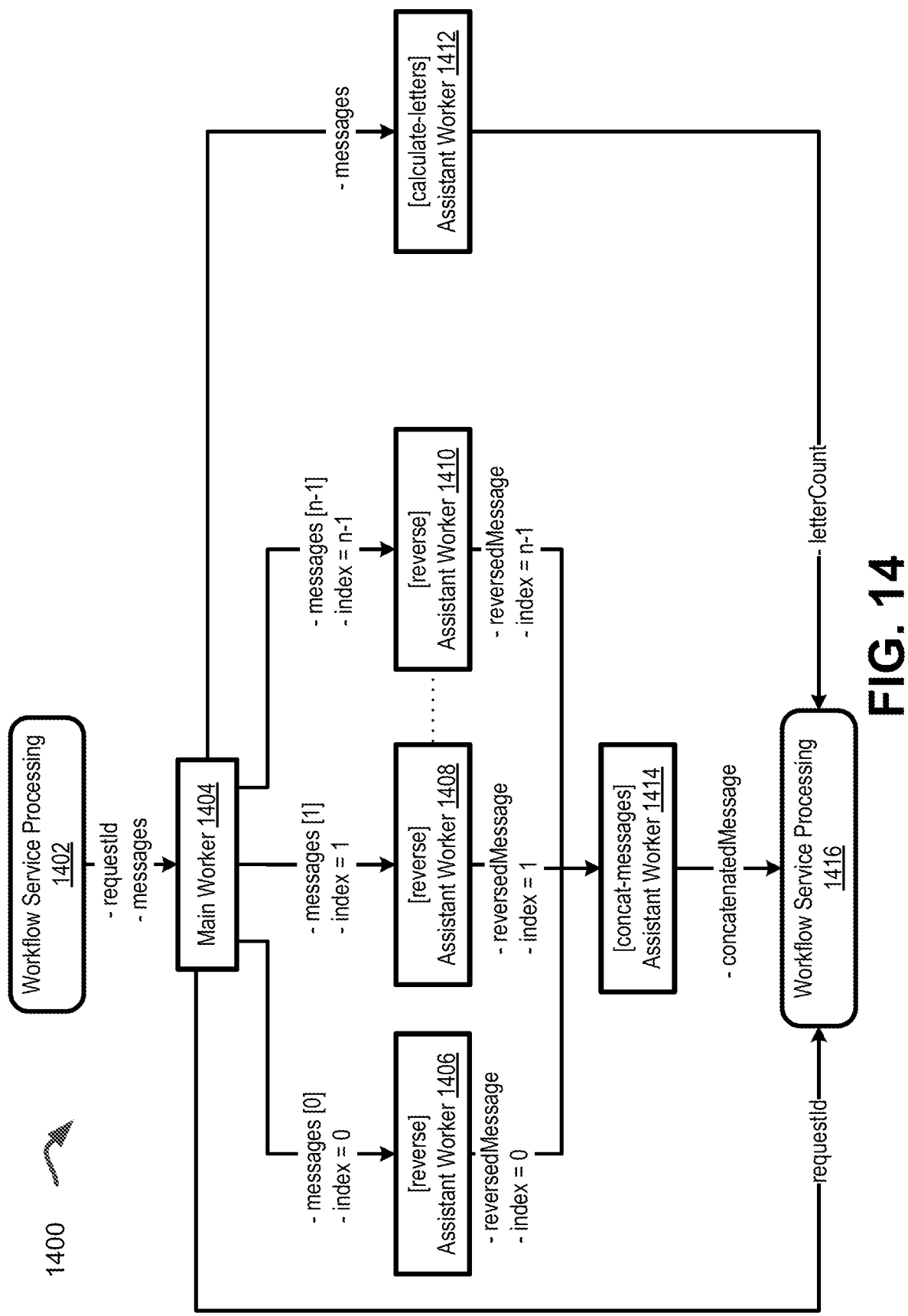
FIG. 14 is an example flow diagram depicting the creation of a sub-task graph using the AutoJoin function in accordance with some implementations of the present disclosure.

FIG. 14 is an example flow diagram depicting the creation of a sub-task graph using the AutoJoin function in accordance with some implementations of the present disclosure. Unlike in the previous examples, in this example, the MainWorker can output a two-level graph, and the final result can be generated by the workflow service side using the Autojoin function.

In this example, the MainWorker at block 1404 can receive from the workflow service of the DPP in block 1402 a requestId and messages (such as requestId and messages depicted in FIG. 10). The MainWorker at bock 1404 can create a sub-task graph that includes three sub-tasks at blocks 1406, 1408, and 1410 to respectively represent each of three messages in reverse order. In the depicted example, each sub-task of blocks 1406, 1408, and 1410 respectively can have a merging sub-task of block 1414 be specified as a dependent sub-task. Accordingly, the merging sub-task at block 1414 may start execution only when all of the sub-tasks of blocks 1406, 1408, and 1410 respectively are executed.

Additionally, the MainWorker at block 1404 can create another sub-task of block 1412 to count the number of letters and can transmit the messages as input data (such as the message input depicted in FIG. 10) for the sub-task of block 1412. In this example, the sub-task at block 1414 can be executed in parallel with sub-tasks at blocks 1406, 1408, and 1410 respectively. Further, the MainWorker at block 1404 can indicate that joining the results of sub-tasks and generating the result of the parent task is to be performed automatically by the workflow service at block 1416. Accordingly, for each message, the sub-task of presenting the received text in reverse order can be executed by the AssistantWorker at blocks 1406, 1408, and 1410 respectively in parallel with the execution of the letter calculation sub-task at block 1414.

When all of the sub-tasks at blocks 1406, 1408, and 1410 are completed, their results are provided as input for the execution of the concat-messages join (i.e., concatenation) sub-task by AssistantWorker at block 1414, which combines the received messages into one. Subsequently, at block 1416, the workflow service of the DPP receives the results of the concatenation sub-task of block 1414 and the count of the number of letters from the sub-task of block 1414 and combines them with the requestId to generate the final result of the task.

These examples indicate the variability in achieving the same objective in different ways in accordance with the various implementations described herein that include the use of Autojoin sub-tasks, the use of different workers, and the ability to assign a sub-task of a parent task to a different worker than the worker that created it or to the same worker that created it. In the various implementations, the variability of execution can be adjusted and selected by the programming the worker with corresponding parameters that are used for the execution of the task. Thus, as described in detail above, the described implementations allow the execution of generated tasks and sub-tasks represented in the form of a DAG with improved efficiency and flexibility.

FIG. 15 depicts an example computer system 1500 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1500 includes a processing device 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)), and a data storage device 1516, which communicate with each other via a bus 1508.

Processing device 1502 represents one or more general-purpose processing devices such as a microprocessor, central processing unit, or the like. More particularly, the processing device 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1502 may also be one or more special-purpose processing devices such as an application specific integrated circuit (ASIC), a field programmable gate array (FPGA), a digital signal processor (DSP), network processor, or the like. The processing device 1502 is configured to execute instructions 1526 for implementing the various subcomponents/modules described herein, such as the DPP 140, the workers 11, 112, 121, 122, and/or the workflow service 142 of FIG. 1 and to perform the operations discussed herein (e.g., operations of method 200 and example workflows 400-900, and 1200-1400 respectively of FIGS. 4-9, and 12-14).

The computer system 1500 may further include a network interface device 1522. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1520 (e.g., a speaker). In one illustrative example, the video display unit 1510, the alphanumeric input device 1512, and the cursor control device 1514 may be combined into a single component or device (e.g., an LCD touch screen).

The data storage device 1516 may include a computer-readable medium 1524 on which is stored the instructions 1526 embodying any one or more of the methodologies or functions described herein. The instructions 1526 may also reside, completely or at least partially, within the main memory 1504 and/or within the processing device 1502 during execution thereof by the computer system 1500, the main memory 1504 and the processing device 1502 also constituting computer-readable media. In some implementations, the instructions 1526 may further be transmitted or received over a network via the network interface device 1522.

While the computer-readable storage medium 1524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A system comprising:
  a memory; and
  a processor communicatively coupled to the memory to perform operations comprising:
    receiving, by a worker execution stream, from a workflow service, a definition of a task;
    responsive to determining that the definition of the task satisfies a predefined criterion, dividing the task into a set of sub-tasks;
    generating a definition of a sub-task workflow for the set of sub-tasks; and
    causing the workflow service to distribute, based on the definition of the sub-task workflow, the sub-tasks of the set to one or more worker execution streams for execution.

2. The system of claim 1, wherein the processor is to further perform the operations comprising:
  determining, by the worker execution stream, whether the definition of the task satisfies the predefined criterion; and
  responsive to determining that the definition of the task does not satisfy the predefined criterion, executing, by the worker execution stream, the task.

3. The system of claim 1, wherein determining whether the definition of the task satisfies the predefined criterion is performed based on at least one item selected from: values of one or more parameters of the task, resources available to the worker execution stream, and resources available to one or more other worker execution streams.

4. The system of claim 1, wherein the processor is to further perform the operations comprising:
  executing a worker execution stream, wherein the worker execution stream comprises a plurality of execution threads associated with a workflow of the workflow service.

5. The system of claim 1, wherein the processor is to further perform the operations comprising:

receiving, by the worker execution stream, from the workflow service, one or more parameters for executing the task.

6. The system of claim 1, wherein generating the definition of a sub-task workflow comprises generating a sub-task graph defining the sub-task workflow in a text-based file format.

7. The system of claim 1, wherein the worker execution stream is provided by one of: a virtual machine, an execution container, a processing thread, or a process.

8. A method comprising:
receiving, by a worker execution stream, from a workflow service, a definition of a task;
responsive to determining that the definition of the task satisfies a predefined criterion, dividing the task into a set of sub-tasks;
generating a definition of a sub-task workflow for the set of sub-tasks; and
causing the workflow service to distribute, based on the definition of the sub-task workflow, the sub-tasks of the set to one or more worker execution streams for execution.

9. The method of claim 8, further comprising:
determining, by the worker execution stream, whether the definition of the task satisfies the predefined criterion; and
responsive to determining that the definition of the task does not satisfy the predefined criterion, executing, by the worker execution stream, the task.

10. The method of claim 8, wherein determining whether the definition of the task satisfies the predefined criterion is performed based on at least one item selected from: values of one or more parameters of the task, resources available to the worker, and resources available to one or more other worker execution streams.

11. The method of claim 8, further comprising:
executing a worker execution stream, wherein the worker execution stream comprises a plurality of execution threads associated with a workflow of the workflow service.

12. The method of claim 8, further comprising:
receiving, by the worker execution stream, from the workflow service, one or more parameters for executing the task.

13. The method of claim 8, wherein generating the definition of a sub-task workflow comprises generating a sub-task graph defining the sub-task workflow in a text-based file format.

14. The method of claim 8, wherein the worker execution stream is provided by one of: a virtual machine, an execution container, a processing thread, or a process.

15. A non-transitory computer-readable storage medium comprising instructions that, when executed by a processing device, cause the processing device to perform operations comprising:
receiving, by a worker execution stream, from a workflow service, a definition of a task;
responsive to determining that the definition of the task satisfies a predefined criterion, dividing the task into a set of sub-tasks;
generating a definition of a sub-task workflow for the set of sub-tasks; and
causing the workflow service to distribute, based on the definition of the sub-task workflow, the sub-tasks of the set to one or more worker execution streams for execution.

16. The non-transitory computer-readable storage medium of claim 15, wherein the instructions further cause the processing device to perform operations comprising:
determining, by the worker execution stream, whether the definition of the task satisfies the predefined criterion; and
responsive to determining that the definition of the task does not satisfy the predefined criterion, executing, by the worker execution stream, the task.

17. The non-transitory computer-readable storage medium of claim 15, wherein determining whether the definition of the task satisfies the predefined criterion is performed based on at least one item selected from: values of one or more parameters of the task, resources available to the worker, and resources available to one or more other worker execution streams.

18. The non-transitory computer-readable storage medium of claim 15, wherein the instructions further cause the processing device to perform operations comprising:
executing a worker execution stream, wherein the worker execution stream comprises an execution threads associated with a workflow of the workflow service, wherein the worker execution stream is provided by one of: a virtual machine, an execution container, a processing thread, or a process.

19. The non-transitory computer-readable storage medium of claim 15, wherein the instructions further cause the processing device to perform operations comprising:
receiving, by the worker execution stream, from the workflow service, one or more parameters for executing the task.

20. The non-transitory computer-readable storage medium of claim 15, wherein generating the definition of a sub-task workflow comprises generating a sub-task graph defining the sub-task workflow in a text-based file format.

\* \* \* \* \*